(12) United States Patent
Hayashi

(10) Patent No.: US 6,532,015 B1
(45) Date of Patent: Mar. 11, 2003

(54) IMAGE GENERATION SYSTEM AND PROGRAM

(75) Inventor: Atsushi Hayashi, Yokohama (JP)

(73) Assignee: Namco Ltd., Tokyo (JP)

( * ) Notice: Subject to any disclaimer, the term of this patent is extended or adjusted under 35 U.S.C. 154(b) by 262 days.

(21) Appl. No.: 09/638,959

(22) Filed: Aug. 16, 2000

(30) Foreign Application Priority Data

Aug. 25, 1999 (JP) .......................................... 11-238651

(51) Int. Cl.$^7$ .............................................. G06T 17/00
(52) U.S. Cl. ...................................................... 345/474
(58) Field of Search ................................ 345/418, 473, 345/474, 475

(56) References Cited

U.S. PATENT DOCUMENTS 5,734,807 A   3/1998   Sumi
6,320,988 B1 * 11/2001 Yamaguchi et al. ........ 345/418

FOREIGN PATENT DOCUMENTS

GB   2324690 A   10/1998
GB   2332863 A   7/1999
JP   10-21420   1/1998

* cited by examiner

Primary Examiner—Cliff N. Vo
(74) Attorney, Agent, or Firm—Oliff & Berridge, PLC

(57) ABSTRACT

An image generation system and program for implementing motion representation with variety while using a motion play technique based on motion data. The present invention performs a first motion correction in which a head or gun of an enemy character is turned toward a player (or player's character or virtual camera) and a second motion correction in which the skeleton shape of the enemy character is slightly changed when the enemy character is hit by a shot. In the second motion correction, the skeleton shape is slightly changed by using a restoring force for returning the skeleton shape to its original form and hit information (hitting force and direction) while gradually reducing the amount of slight change of the skeleton shape as time passes. The position and rotation angle of the base (or body coordinate system) of the enemy character are fixed to those specified by the motion data. Flags to be used for individually enabling or disabling motion corrections are respectively set to the enemy characters.

30 Claims, 21 Drawing Sheets

TIMER VALUE
TM=90

TM=60

TM=30

TM=0

DURING GAME PLAY

HF=1
GF=1
RF=1

PLAYER

DURING DEMONSTRATION (OR ATTRACTION)

HF=0
GF=0
RF=0

PLAYER

IMAGE GENERATION SYSTEM AND PROGRAM

BACKGROUND OF THE INVENTION

1. Filed of Industrial Application

The present invention relates to an image generation system and program.

2. Description of the Related Art

There is known an image generation system which can generate an image as viewed within a virtual three-dimensional or object space from a given viewpoint. Such a system is very popular since one can experience a so-called virtual reality through it. Now considering an image generation system for playing a gun game, a player (or operator) can enjoy a three-dimensional shooting game by manipulating a gun-shaped controller (or shooting device) to shot targets such as enemy characters (or model objects) and the like which are displayed on a screen.

In such an image generation system, it is important that images can be generated with reality to improve the degree of virtual reality for players. It is thus desired that the motion of enemy characters is also represented with reality. In the conventional image generation systems, motion data for specifying a skeleton shape (or skeleton configuration) for each enemy character in each frame is previously prepared. Based on such motion data, a motion play (or motion animation) process is performed to represent the motion of that enemy character.

However, such a motion play process only based on the motion data has the following problems:

(1) Even though the position or direction of a player (or a player's character controlled by the player or a virtual camera) varies or a shot (or bullet or the like) from the player hits the enemy character, that enemy character moves with the same motion at all times. Thus, the representation of motion becomes monotonous.

(2) If it is attempted to give variety to the motion of the enemy character to prevent monotonous representation, the motion data must be increased. However, since the capacity of a memory for storing the motion data is limited, variety of the motion is also limited.

On the other hand, the motion play process based on the motion data is advantageous in that it can move and arrange enemy characters in the same manner at all times.

Such a type of gun game proceeds according to a particular story, and a virtual camera always moves along a given pattern according to the story. If an enemy character moves irregularly, the virtual camera will not be able to take the enemy character. Thus, the game story cannot smoothly be developed.

However, the motion play process based on the motion data can move and arrange the enemy characters in the same manner at all times so that the enemy characters can surely be taken by the virtual camera at all times. It is thus desirable that such a motion play process is more effectively utilized.

SUMMARY OF THE INVENTION

The present invention is devised in the light of the above problems and has as an objective thereof the provision of an image generation system and program which can implement motion representation with more reality and variety using a less amount of data by utilizing a motion play process based on the motion data.

In order to solve the above problems, this invention provides an image generation system comprising: means for performing motion correction in which a skeleton shape of a model object specified by motion data is slightly changed based on hit information when the model object including a plurality of parts is hit; and means for generating images including an image of the model object. This invention also provides a computer-usable information storage medium which comprises information (a program, data or the like) for implementing (or executing) the above-described means. The present invention further provides a computer-usable program embodied on an information storage medium or in a carrier wave, the program comprising a processing routine for implementing (or executing) the above-described means.

The model object is formed by a plurality of parts, and the position or rotation angle of each part is specified by the position or rotation angle of the corresponding one of the bones defining the skeleton. However, the skeleton and bones will virtually be represented, but actually be in the form of data representing the position or rotation angle of each part.

Moreover, the skeleton shape specified by the motion data is slightly changed when the model object is hit by shot, punch, kick, impact or the like. This makes it possible to represent the reaction of the hit model object. As a result, only a single set of motion data is sufficient to implement the motion representation with more reality and variety.

Note that the skeleton shape specified by the motion data may be determined only by the motion data or may be the one already subjected to the other motion correction once at least.

The image generation system, information storage medium and program according to the present invention may perform the motion correction based on the hit information and a restoring force for returning the skeleton shape of the model object to an original skeleton shape specified by the motion data. The model object will be slightly vibrated by hit impact and the motion representation of with more reality and variety can be implemented.

The image generation system, information storage medium and program according to the present invention may perform the motion correction such that the amount of slight change of the skeleton shape by the hit information is gradually reduced as time passes. This makes it possible to represent the amplitude of vibration of the model object which is gradually reduced as time passes after the hit.

The image generation system, information storage medium and program according to the present invention may perform the motion correction while substantially fixing a position or rotation angle of a given part of the model object. This makes it possible to perform the motion correction in which the skeleton shape is slightly changed by the hit, while turning a first part (such as a head, hand or fire arm) of an object toward a given target position, or, while fixing a position or rotation angle of a second part (such as a foot) to a position of rotation angle specified by the motion data, for example. As a result, only a single set of motion data is sufficient to implement the motion representation with more reality and variety.

The image generation system, information storage medium and program according to the present invention may perform the motion correction while substantially fixing a position or rotation angle of the body coordinate system of the model object relative to the world coordinate system to a position or rotation angle specified by the motion data. This makes it possible to change the position or rotation angle of the body coordinate system of the model object in accordance with the motion data. Therefore, the skeleton shape of the model object (movement of each part) is changed by the motion correction, but the entire movement of the model object can be controlled to faithfully follow the motion data. As a result, even if the situation of game varies, for example, the virtual camera can positively take the model object at all times.

The image generation system, information storage medium and program according to the present invention may perform the motion correction after a first motion correction has been finished in which a given part of the model object is turned toward a given target position. Such motion correction through a number of steps makes it possible to implement the motion representation with more variety.

The present invention further provides an image generation system for generating an image, comprising: means for performing a first motion correction in which a skeleton shape of a model, object specified by motion data is changed, the model object including a plurality of parts, then performing a second motion correction in which the skeleton shape of the model object which has been changed by the first motion correction is further changed, . . . and finally performing an N-th (N≧2) motion correction in which the skeleton shape of the model object which has been changed by an (N−1)-th motion correction is still further changed; and means for generating images including an image of the model object. This invention also provides a computer-usable information storage medium which comprises information (a program, data or the like) for implementing (or executing) the above-described means. The present invention further provides a computer-usable program embodied on an information storage medium or in a carrier wave, the program comprising a processing routine for implementing (or executing) the above-described means.

This makes it possible to perform a multi-step motion correction process including the first through N-th motion corrections. Even if only a single set of motion data is used for a motion, that motion can be viewed differently if the first to N-th motion corrections are different, leading to the motion representation with variety.

In the image generation system, information storage medium and program according to the present invention, information for respectively enabling or disabling the first to N-th motion corrections may be set to the model object. This makes it possible, for example, to enable the first and second motion correction for a first model object, enable the first motion correction but disable the second motion correction for a second model object, and disable the first and second motion correction for a third model object. Therefore, even if the same motion data or program is used for a plurality of model objects, these model objects can perform different motions by changing the setting of the information. As a result, model objects which perform various motions can be easily provided.

The image generation system, information storage medium and program according to the present invention may perform the first to N-th motion corrections while substantially fixing a position or rotation angle of the body coordinate system of the model object relative to the world coordinate system to a position or rotation angle specified by the motion data. The skeleton shape of the model object (movement of each part) is changed by the first through N-th motion corrections, but the entire movement of the model object can be controlled to faithfully follow the motion data.

The present invention further provides an image generation system for generating an image, comprising: means for changing a skeleton shape of a model object which includes a plurality of parts such that a given part of the model object is turned toward a given target position and the skeleton shape of the model object is slightly changed when the model object is hit; and means for generating images including an image of the model object. This invention also provides a computer-usable information storage medium which comprises information (a program, data or the like) for implementing (or executing) the above-described means. The present invention further provides a computer-usable program embodied on an information storage medium or in a carrier wave, the program comprising a processing routine for implementing (or executing) the above-described means.

According to the present invention, the model object can be moved to faithfully follow the motion data, while turning a given part (such as a head, hand or fire arm) of the model object toward a given target position (a player's character or a virtual camera, for example). If the model object is hit, its skeleton shape is slightly changed based on the hit information. As a result, a model object which performs an optimum movement as a target (or enemy character) of a shooting game such as a gun game can be implemented.

DESCRIPTION OF THE PREFERRED EMBODIMENTS

One preferred embodiment of the present invention will now be described with reference to the drawings. Although the embodiment of the present invention will be described as to a gun game (or shooting game) using a gun-like controller, the present invention is not limited to such a form but may be applied to any of various other forms.

1. Structure

Figure 1:
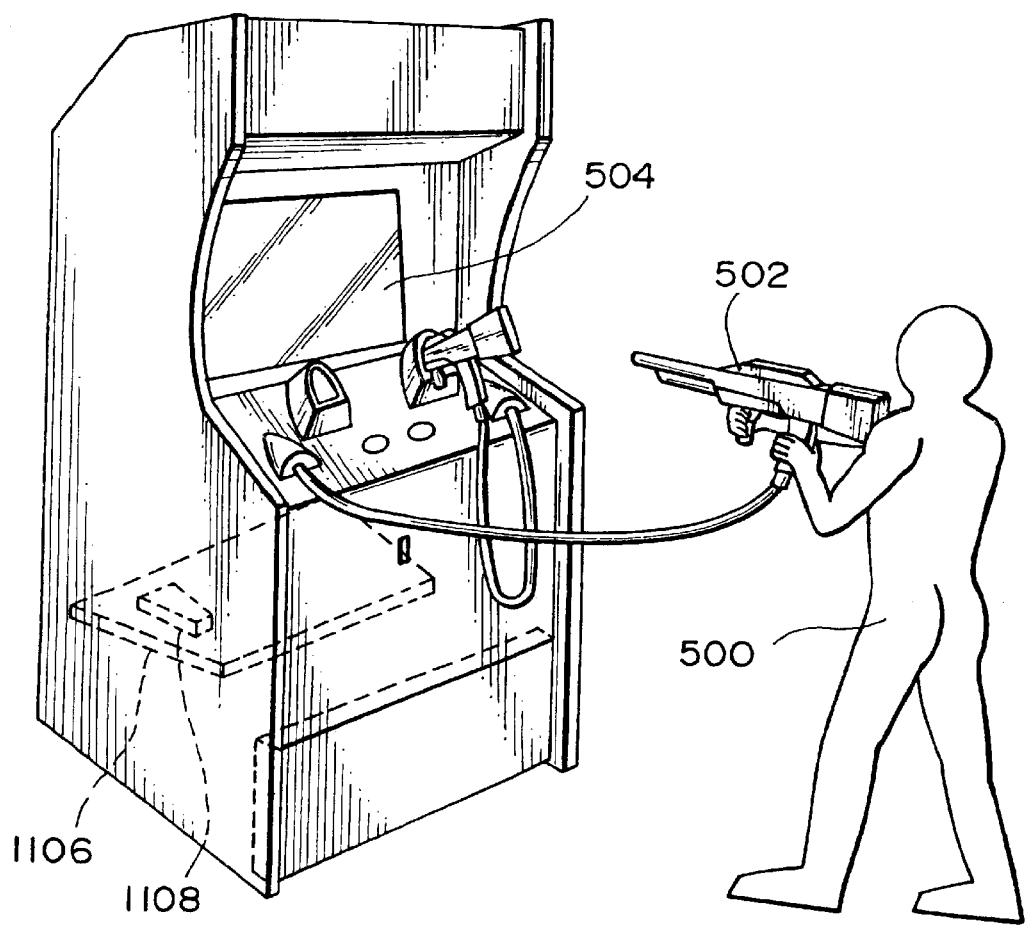
FIG. 1 shows an example of an arcade game system to which the embodiment of the present invention is applied.

FIG. 1 shows an example of an arcade game system to which the present invention is applied.

A player 500 holds a gun-shaped controller (or a shooting device in a broad sense) 502 which is formed similar to a real machine gun. The player 500 can enjoy the gun game by using the gun-shaped controller 500 to shot targets such as enemy characters (or model objects in a broad sense) which are displayed on a screen 504.

When the gun-shaped controller 502 is triggered, virtual shots such as bullets will be continuously fired at high speed. Thus, the player can feel the virtual reality as if he or she is shooting the real machine gun.

Shot (or bullet) hitting positions may be sensed by using a photo-sensor on the gun-shaped controller 502 to sense a scanning ray on the screen or by emitting a light (or laser) beam from the gun-shaped controller 502 and sensing irradiated portion by any suitable means such as CCD camera.

Figure 2:
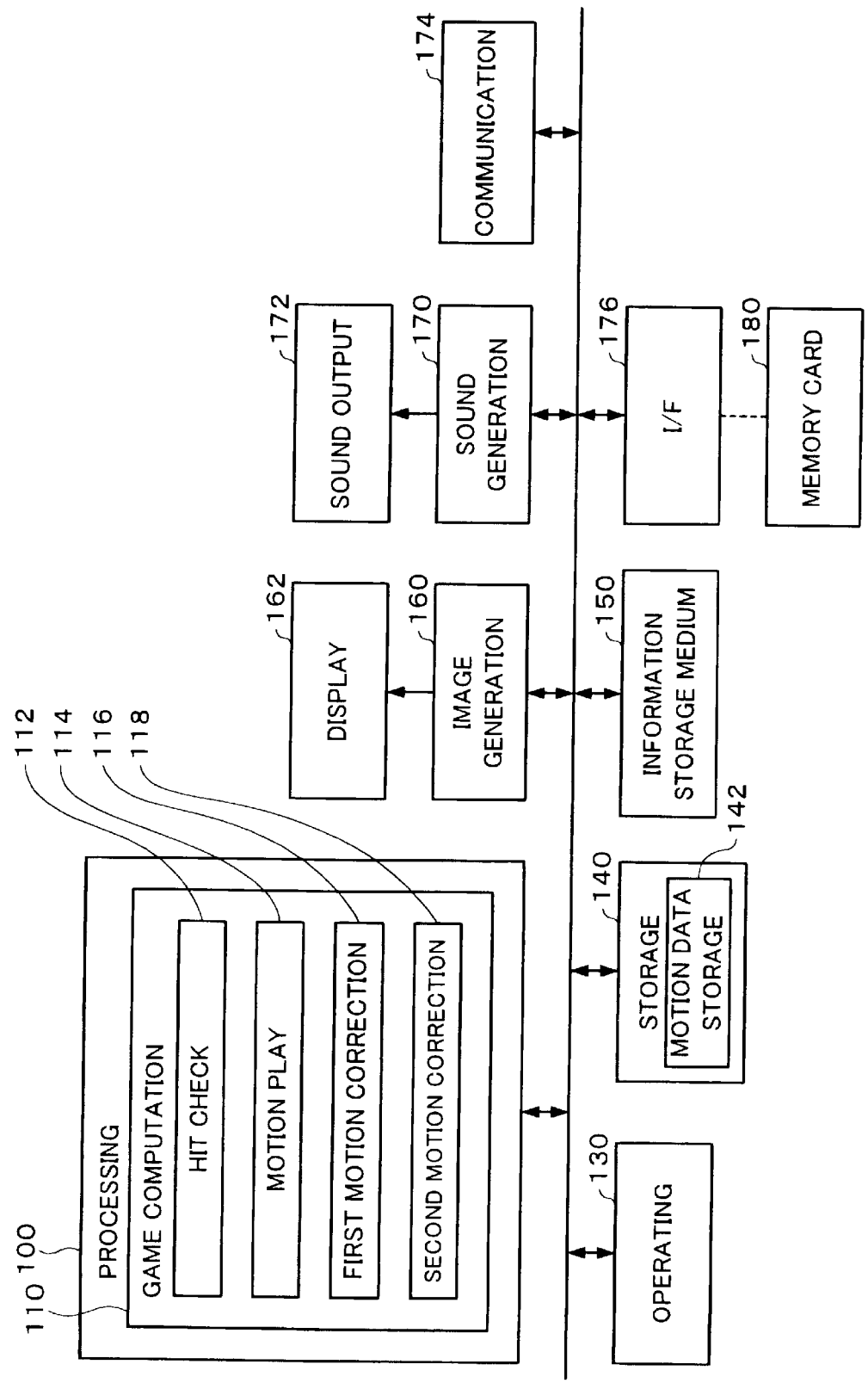
FIG. 2 is a block diagram of an image generation system constructed according to the embodiment of the present invention.

FIG. 2 shows a block diagram of this embodiment. In this figure, this embodiment may comprise at least a processing unit 100 or a processing unit 100 with a storage unit 140 or a processing unit 100 with a storage unit 140 and an information storage medium 150. Each of the other blocks (e.g., operating unit 130, image generation unit 160, display unit 162, sound generation unit 170, sound output unit 172, communication unit 174, I/F unit 176, memory card 180 and so on) may take any suitable form.

The processing unit 100 is designed to perform various processings for control of the entire system, commands to the respective blocks in the system, game computation and so on. The function thereof may be realized through any suitable hardware means such as CPU (CISC type, RISC type), DSP or ASIC (or gate array or the like) or a given program (or game program).

The operating unit 130 is used to input operational data from the player and the function thereof may be realized through any suitable hardware means such as the gun-shaped controller 502 of FIG. 1, a lever, a button, a housing or the like.

The storage unit 140 provides a working area for the processing unit 100, image generation unit 160, sound generation unit 170, communication unit 174, I/F unit 176 and others. The function thereof may be realized by any suitable hardware means such as RAM or the like.

The information storage medium (or computer-usable storage medium) 150 is designed to store information including programs, data and others. The function thereof may be realized through any suitable hardware means such as optical memory disk (CD or DVD), magneto-optical disk (MO), magnetic disk, hard disk, magnetic tape, semiconductor memory (ROM) or the like. The processing unit 100 performs various processings in the present invention (or this embodiment) based on the information that has been stored in this information storage medium 150. In other words, the information storage medium 150 stores various pieces of information (or programs and data) for implementing (or executing) the means of the present invention (or this embodiment) which is particularly represented by the block included in the processing unit 100.

Part or the whole of the information stored in the information storage medium 150 will be transferred to the storage unit 140 when the system is initially powered on. The information stored in the information storage medium 150 may contain at least one of program code set for processing the present invention, image information, sound information, shape information of objects to be displayed, table data, list data, player information, command information for the processings in the present invention, information for performing the processings according to the commands and so on.

The image generation unit 160 is designed to generate and output various images toward the display unit 162 according to instructions from the processing unit 100. The function thereof may be realized through any suitable hardware means such as image generation ASIC, CPU or DSP or according to a given program (or image generation program) or based on image information.

The sound generation unit 170 is designed to generate and output various sounds toward the sound output unit 172 according to instructions from the processing unit 100. The function thereof may be realized through any suitable hardware means such as sound generation ASIC, CPU or DSP or according to a given program (or sound generation program) or based on sound information (waveform data and the like).

The communication unit 174 is designed to perform various controls for communication between the game system and any external device (e.g., host machine or other image generation system). The function thereof may be realized through any suitable hardware means such as communication ASIS or CPU or according to a given program (or communication program).

Information for implementing (realizing) the processings in the present invention (or this embodiment) may be delivered from an information storage medium included in a host machine (or server) to the information storage medium 150 through a network and the communication unit 174. The use of such an information storage medium in the hose device (or server) falls in the scope of the invention.

Part or the whole of the function in the processing unit 100 maybe realized through the function of the image generation unit 160, sound generation unit 170 or communication unit 174. Alternatively, part or the whole of the function in the image generation unit 160, sound generation unit 170 or communication operating unit 174 may be realized through the function of the processing unit 100.

The I/F unit 176 serves as an interface for information interchange between the game system and a memory card (or a portable information storage device including a portable game machine in a broad sense) 180 according to instructions from the processing unit 100. The function thereof may be realized through a slot into which the memory card is inserted, a data write/read controller IC or the like. If the information interchange between the game system and the memory card 180 is to be realized in a wireless manner (e.g., through infra-red communication), the function of the I/F unit 176 may be realized through any suitable hardware means such as semiconductor laser, infrared sensor or the like.

The processing unit 100 further comprises a game computing section 110.

The game computing section 110 is designed to perform various processes such as coin. (or charge) reception, setting of various modes, game proceeding, setting of scene selection, determination of the position and rotation angle. (about X-, Y- or Z-axis) of an object, determination of the view point and visual line (direction), play (or generation) of the motion, arrangement of the object within the object space, hit checking, computation of the game results (or scores), processing for causing a plurality of players to play in a common game space, various game computations including game-over and other processes, based on operational data from the operating unit 130 and according to the data and game program from the memory card 180.

The game computing section 110 comprises a hit check portion 112, a motion play portion 114, a first motion correction portion 116 and a second motion correction portion 118.

The hit check portion 112 is designed to perform a hit check process for checking whether or not a virtual shot emitted by the player through the gun-shaped controller hits an model object. In order to reduce the processing load, it is desirable to perform the hit check process using a simplified object (bounding volume) which is obtained by simplifying the shape of the model object.

The motion play (motion animation) portion 114 is designed to play (replay) the motion of a model object (or enemy character or the like) based on the motion data which have been stored in a motion data storage portion 142.

More particularly, the motion data storage portion 142 has stored the motion data including the position or rotation angle and the like of each bone (or part) in the skeleton of that model object. The motion play portion 114 reads this motion data and moves the bones (or parts) of the model object based on the motion data (or changes the skeleton shape of the model object). Thus, the motion of the model object is animated.

It is particularly desirable that the motion data stored in the motion data storage portion 142 are prepared utilizing motion captures. However, the motion data may be produced in real time through a physical simulation (or a simulation utilizing a physical calculation which may be a pseudo-calculation).

The first motion correction (compensation) portion 116 is designed to change the skeleton shape specified based on the play of motion through the motion correction portion 114.

More particularly, the motion correction is performed to turn the head or fire arm (hand) of the model object toward the player (or player's character or virtual camera). Thus, the motion in the model object is varied depending on the positional relationship between the player and the model object (or enemy character). This can realize real representation of various motions with reduced amount of data.

The second motion correction (compensation) portion 118 is performed to further change the skeleton shape previously changed by the first motion correction portion 116. Thus, the motion in the model object is corrected through multiple steps.

More particularly, the skeleton shape of the model object is slightly changed based on a restoring force for restoring the skeleton shape to its original configuration and hit information (hitting force, hitting direction and so on). Thus, the model object can be represented with fine reactions against the hitting impacts of shot.

The image generation system according to this embodiment may be either of a single-player dedicated system in which only a single player can play the game or a multi-player system in which a plurality of players can play the same game at the same time.

If a plurality of players play the game, game images and sounds to be provided to these players may be generated by a single terminal or by a plurality of terminals interconnected through a network (or transmission line or communication line)

2. Features of this embodiment

Figure 3:
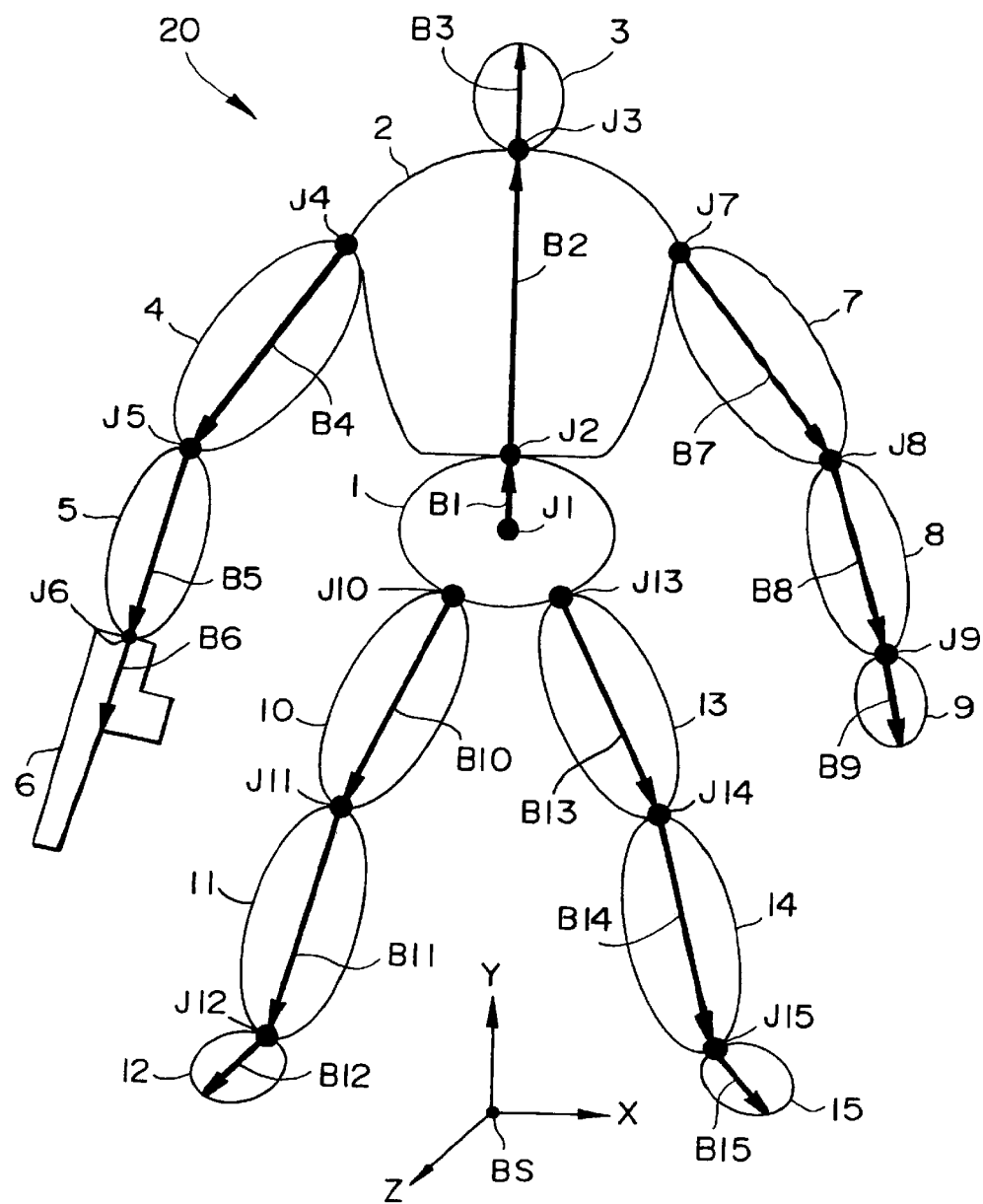
FIG. 3 shows an example of a skeleton of an enemy character (or a model object)

FIG. 3 shows an enemy character (or model object) 20 having a skeleton shape (configuration).

The skeleton shape of FIG. 3 is formed by a parent-child structure of bones (or parts) B1 to B15. For example, the parent of B15 is B14; the parent of B14 is B13; and the parent of B13 is B1. The parent of B12 is B11; the parent of B11 is B10; and the parent of B10 is B1. The parent of B9 is B8; the parent of B8 is B7; and the parent of B7 is B2. The parent of B6 is B5; the parent of B5 is B4; the parent of B4 is B2. The parent of B3 is B2, and the parent of B2 of B1. Finally, the parent of B1 is a base BS.

The base BS is the body coordinate system for the enemy character (or model object) 20. When the position or rotation angle of this base relative to a world coordinate system is varied, the entire enemy character 20 can be rotated or moved.

Figure 4:
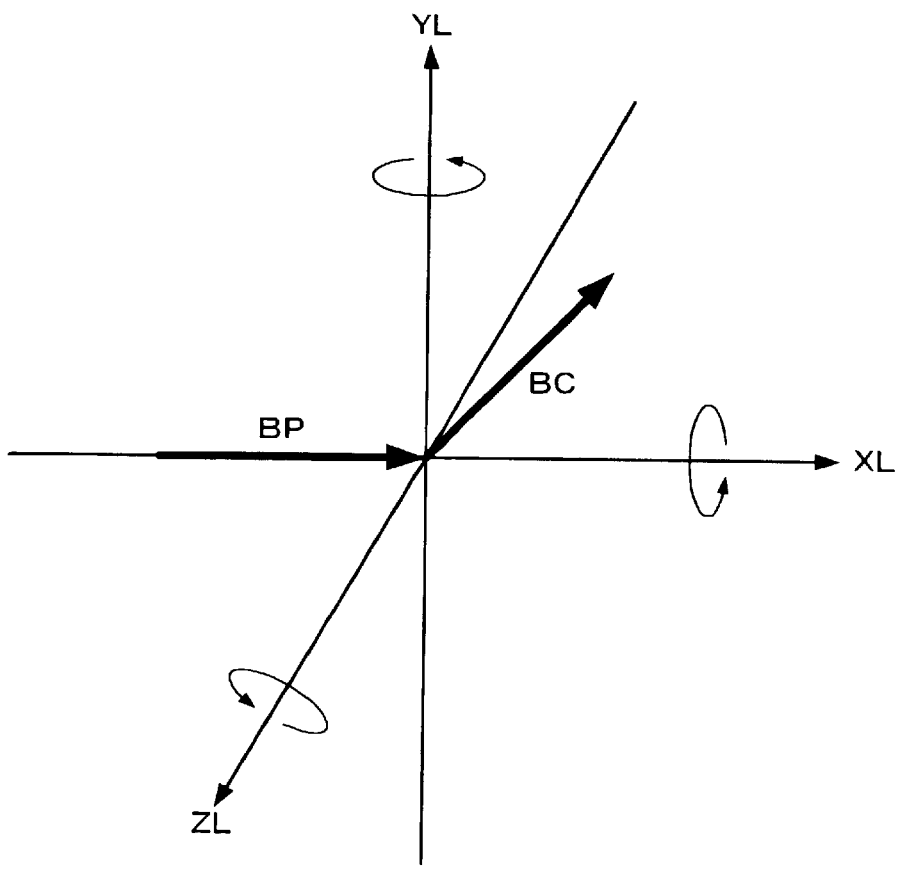
FIG. 4 illustrates a rotation angle of a bone.

The position and rotation angle of each of the bones are represented relative to its parent. For example, the position (or joint) J2 of the bone B2 may be represented relative to the position J1 of the parent bone B1. As shown in FIG. 4, the rotation angle of the child bone BC may be represented relative to axes XL, YL and ZL, for example, if the parent bone BP is arranged on the axis XL.

In this connection, the bones B1 to B15 of FIG. 3 are not actually displayed, but are virtual bones which are actually data (coordinate transformation matrix) representing the position or rotation angle of each part of the enemy character (or model object) 20.

Data of the positions J1 to J15 and rotation angles of the bones B1 to B15 (or only the rotation angles) is stored in the motion data storage portion 142 of FIG. 2, as the motion data. It is now assumed herein that a walk motion includes a series of reference motions (or attitudes) MP1, MP2, MP3, ... MPN. In this case, data of the position and rotation angle of each bone in each of these reference motions MP1, MP2, MP3, ... MPN is stored in the motion data storage portion 142. The motion play can be implemented by sequentially reading the reference motion data as time passes, such as by reading the positions and rotation angles of each bone relative to the reference motion MP1 in the first frame, reading the positions and rotation angles of each bone relative to the reference motion MP2 in the second frame, and so on.

In this embodiment, the position and rotation angle of the base BS (or body coordinate system) relative to the world coordinate system may be specified by the motion data.

The enemy character 20 of FIG. 3 includes various parts such as hip 1, breast 2, head 3, upper right arm 4, right forearm 5, right hand (gun) 6, upper left arm 7, left forearm 8, left hand 9, right thigh 10, right shin 11, right foot 12, left thigh 13, left shin 14 and left foot 15, all of which may be moved to follow the bones B1 to B15, respectively. As the skeleton shape formed by the bones B1 to B15 is changed, the shape of the enemy character 20 will correspondingly be changed. A portion of each bone near its joint may follow the adjacent bones at a predetermined rate. For example, the portion of the upper arm 4 near the joint J5 may follow both the bones B4 and B5 at a predetermined rate. Thus, the shape near any joint may more smoothly be changed.

Figure 5:
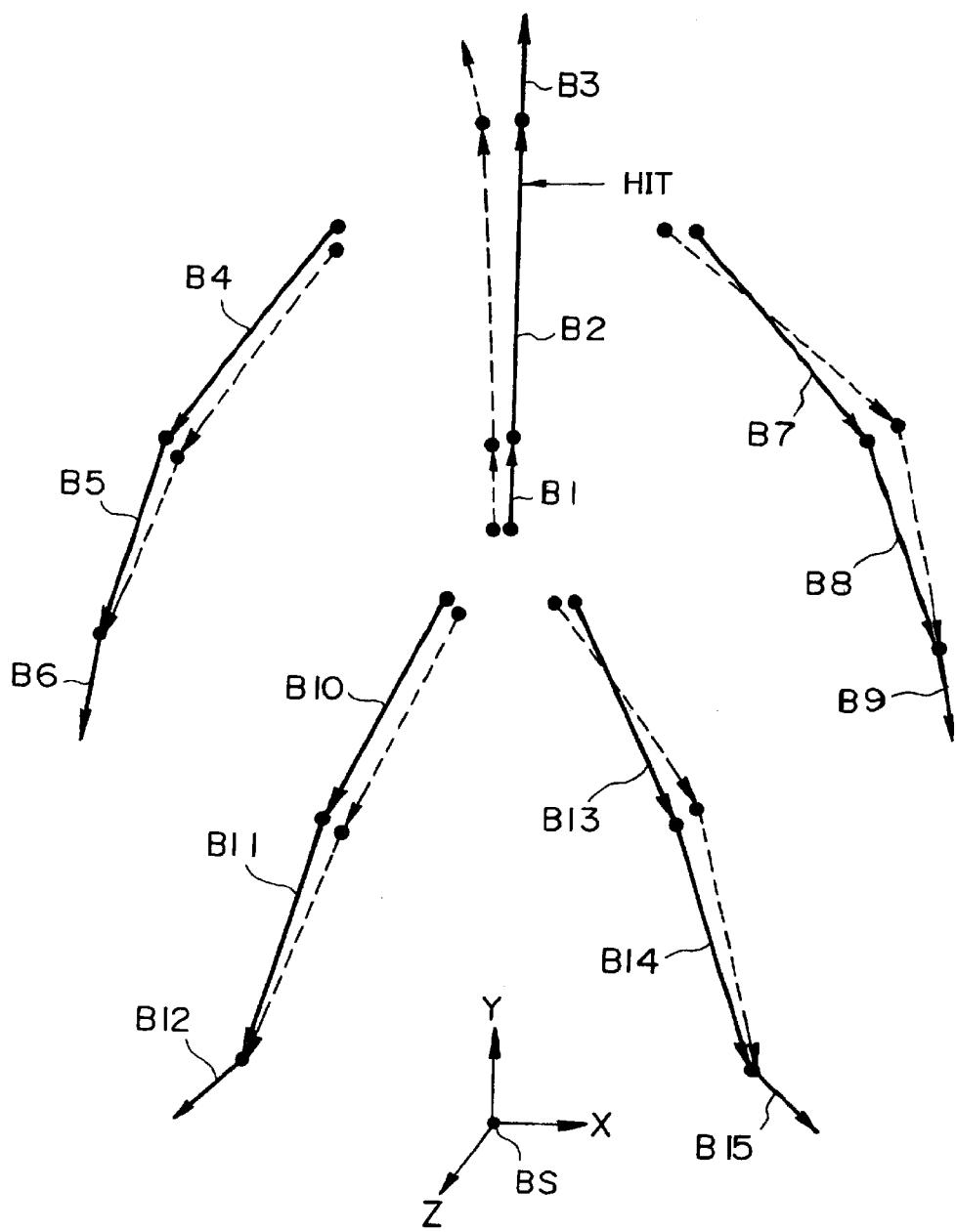
FIG. 5 illustrates the motion correction for slightly changing the skeleton shape based on the hit information.

In this embodiment, when the enemy character is hit by shot or the like, the motion correction is performed to slightly change the skeleton shape of the model object specified by the motion data (which may be the other skeleton shape already subjected to other corrections) according to the hitting force and direction (or hit information in a broad sense). For example, in FIG. 5, a shot hits an enemy character at its breast. As a result, the skeleton shape is slightly changed depending on the hitting force and direction.

Thus, the skeleton shape will be changed differently depending on hitting force and direction. For example, if the hitting force is larger, the skeleton shape will also be changed with increased amount. If the hitting direction is the first direction, the skeleton shape will be changed substantially along the first direction. If the hitting direction is the second direction, the skeleton shape will be changed substantially along the second direction. In such a manner, the skeleton shape can be variously changed while using only a single set of motion data comprising data of a series of reference motions. As a result, the motion representation with reality and variety can be implemented using a less amount of data.

In this embodiment, furthermore, the motion correction is made using a restoring force for returning the skeleton shape into its original configuration (which is specified based on the motion data) in addition to the hit information.

Figure 6A:
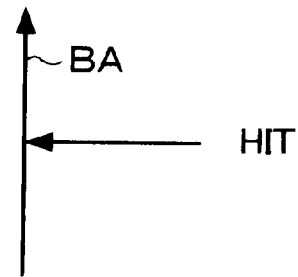
FIGS. 6A, 6B and 6C illustrate a motion correction technique using a restoring force.
Figure 6B:
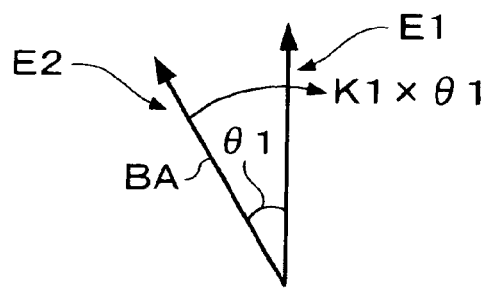
Figure 6C:
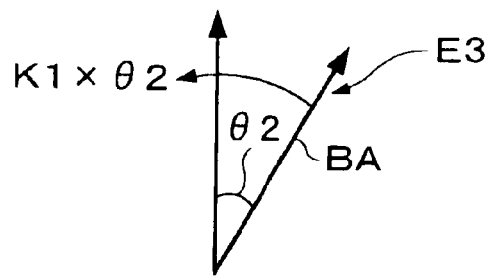

If the enemy character is hit in the right direction as shown in FIG. 6A, for example, a bone BA is rotated counterclockwise as shown in FIG. 6B. When the bone BA is rotated counterclockwise by θ1 as shown by E2 from its original direction shown by E1, a restoring force, −K1×θ1, acts on the bone BA to rotate it counterclockwise. On the other hand, when the bone BA is rotated clockwise by θ2 as shown by. E3 of FIG. 6C from its original direction shown by E1, a restoring force, −K1×θ2, acts on the bone BA to rotate it counterclockwise.

When such a restoring force acts on each of the bones, each bone performs elastic (spring) movement. Each time when a shot hits a bone, the skeleton shape will be slightly vibrated. As a result, the enemy character can be seen as if it trembles with hit shots. This can implement the motion play with more reality, which would not be obtained by a simple motion play.

In this embodiment, the motion correction is performed such that the amount of slight change of the skeleton shape based on the hit information is gradually reduced as time passes.

Figure 7A:
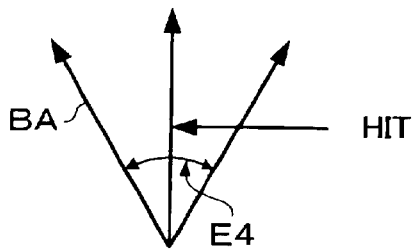
FIGS. 7A, 7B, 7C and 7D illustrate a technique of gradually reducing the amount of slight change of the skeleton shape as time passes.

More particularly, if a shot hits the enemy character, the timer value TM may be set 90 as shown in FIG. 7A. The timer value TM is decremented by each frame.

Figure 7B:
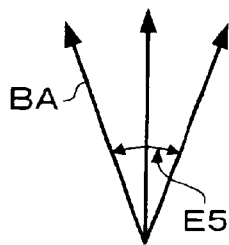
Figure 7C:
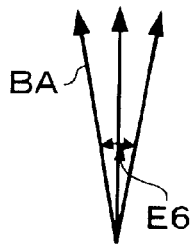
Figure 7D:
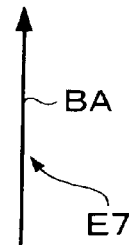

If the timer value TM is 90 (initial value), the amplitude of the rotation angle in the bone BA becomes maximum as shown by E4 in FIG. 7A. As the timer value TM is decremented from a hit through passage of time as shown by E5 in FIG. 7B, E6 in FIG. 7C and E7 in FIG. 7D, the amplitude of the rotation angle in the bone BA is gradually reduced.

Thus, the skeleton shape maybe shown so that it is largely vibrated by a shot hit with the amplitude thereof being then gradually reduced. Thus, the enemy character trembling with hit shots can be shown more really. As a result, the game system can realize the more real representation of motion which would not be obtained by a simple motion play.

Figure 8:
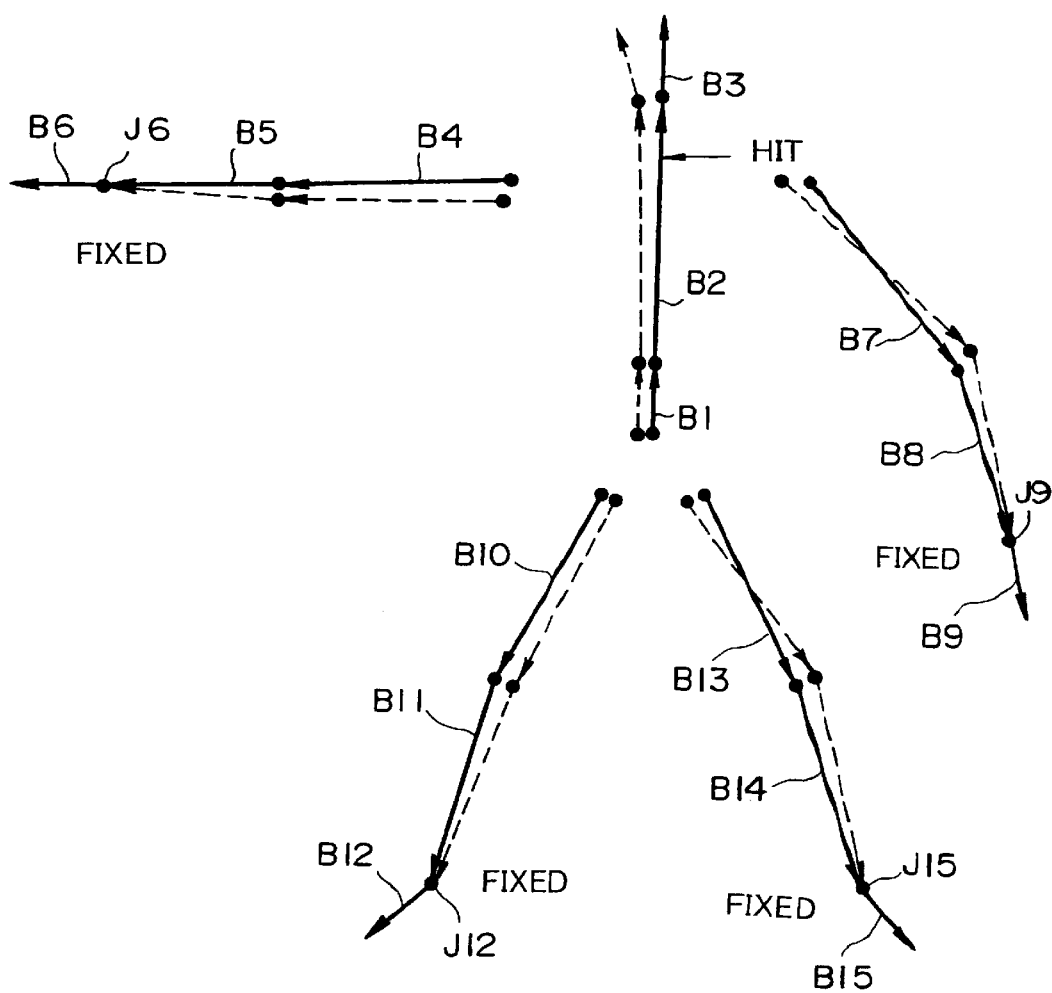
FIG. 8 illustrates a technique of performing the motion correction while fixing a hand (or gun) or foot.

In this embodiment, furthermore, the motion correction is performed while substantially fixing the position and rotation angle of a given part (or bone) in the enemy character. As shown in FIG. 8, for example, the skeleton shape is slightly changed while fixing the positions J6, J9, J12 and J15 and rotation angles of the right hand (or bone B6), left hand (or bone B9), right foot (or bone B12) and left foot (or bone B15), respectively.

Thus, the position and direction of the gun (or fire arm) integrally formed with the hand can be prevented from being vibrated due to hit shots. Therefore, the enemy character can be represented such that it trembles with hit shots while firmly holding the gun toward the player.

By performing the motion correction with a foot of the enemy character fixed, it can be prevented that the enemy character is seen as if it walks with gliding steps.

In other words, if the position and rotation angle of the enemy character's foot are changed by the motion correction for slightly changing the skeleton shape, a problem will be raised in that the foot to be stayed may glide on the ground. In this embodiment, however, the position and rotation angle of the enemy character's foot are fixed as shown in FIG. 8, when the motion correction for slightly changing the skeleton shape is made. Even if such a motion correction is made, the position and rotation angle of the foot will not be shifted from those specified by the motion data. Since the motion data has previously been prepared not to slide a foot, the enemy character's foot will not slide by the motion correction. As a result, the motion of the enemy character will be more natural.

In this embodiment, furthermore, the motion correction is performed such that the position and rotation angle of the base BS (or body coordinate system) in the enemy character of FIG. 3 relative to the world coordinate system (XW, YW, ZW) are substantially fixed relative to those specified based on the motion data.

Figure 9:
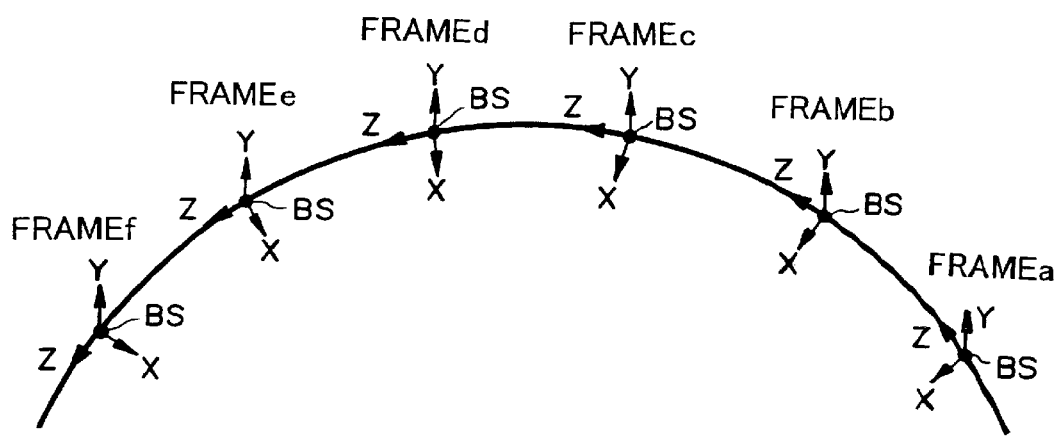
FIG. 9 illustrates a technique of performing the motion correction while fixing the position and rotation angle of a base (or body coordinate system) to a position and rotation angle specified by the motion data.
Figure 9:
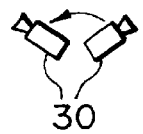
Figure 9:
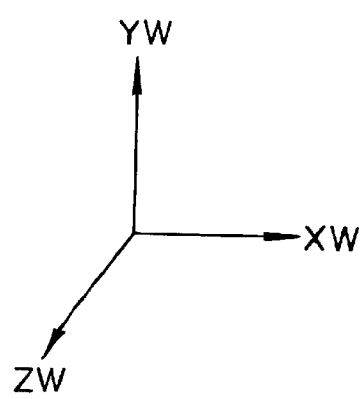

For example, FIG. 9 shows that the position and rotation angle of the base BS are varied based on the motion data. In addition, a virtual camera 30 is changed in position and rotation angle such that it can always take the enemy character moving with movement of the base BS.

In such a case, if the position and rotation angle of the base BS (or the position and rotation angle thereof relative to the world coordinate system) are varied due to the motion correction for slightly changing the skeleton shape, such a situation that the virtual camera cannot take the enemy character may occur. Thus, the camera work to be done along the development of story will be made impossible.

In this embodiment, the motion correction is performed while fixing the position and rotation angle of the base BS relative to those specified based on the motion data. Therefore, the position and rotation angle of the base BS can be varied to faithfully follow the motion data even if the parts of the enemy character are changed by the motion correction. Consequently, such a situation that the virtual camera 30 is not able to take the enemy character can be avoided and the camera work to be done along the development of story can be realized.

In this embodiment, the multi-step motion correction is made. For example, the first motion correction may first be executed to change the skeleton shape specified based on the motion data. The second motion correction is then performed to further change the skeleton shape changed by the first motion correction. Furthermore, the third, fourth . . . and N-th motion corrections may be performed sequentially.

Figure 10:
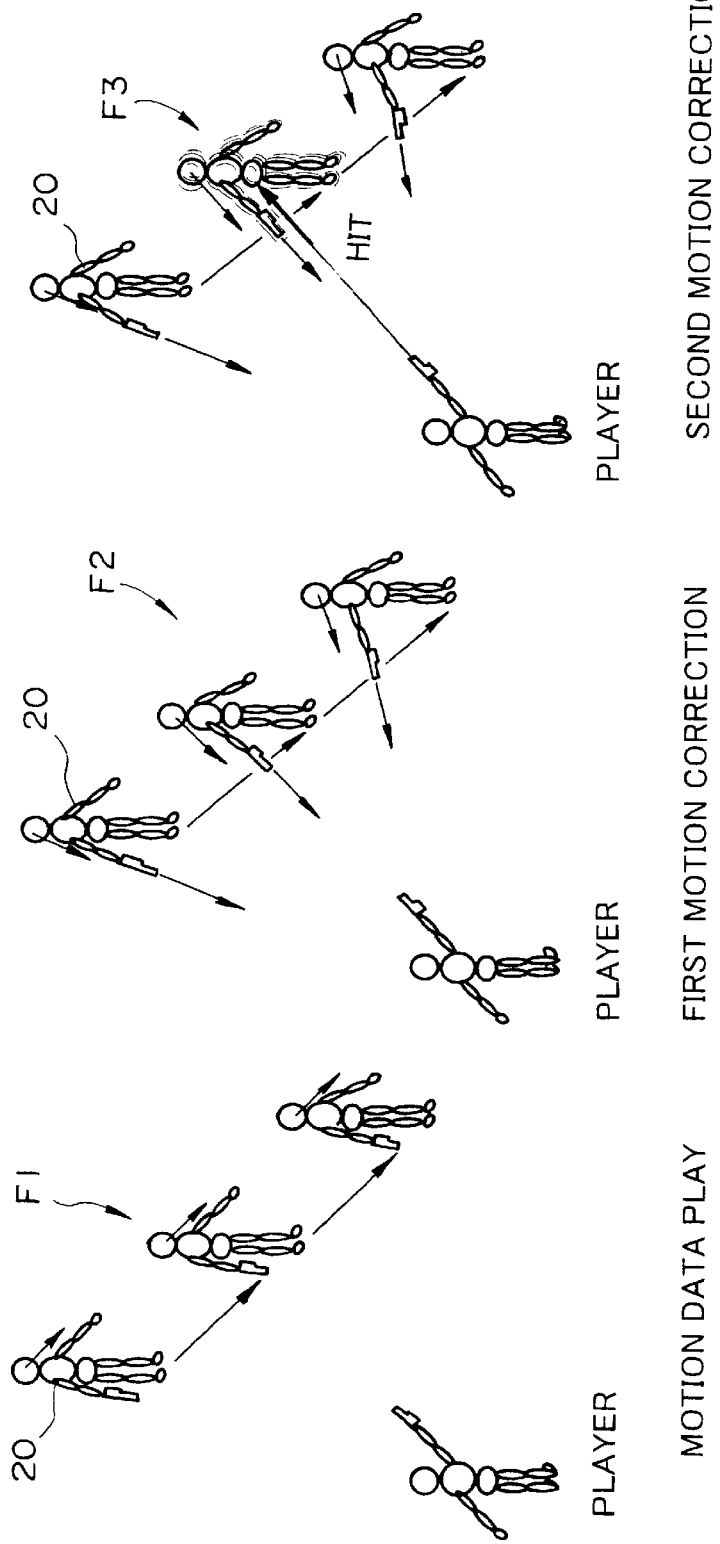
FIG. 10 illustrates a technique of performing a multi-step correction process including a first motion correction for turning a head or gun of the model object toward a player and a second motion correction for slightly changing the skeleton shape.

More particularly, the motion play is being performed merely based on the motion data at F1 of FIG. 10. In this case, the enemy character 20 performs, for example, its walk motion based on the motion data but is not turned toward the player (or player's character or virtual camera).

On the other hand, at F2 of FIG. 10, the first motion correction is made to turn the head and gun (or right hand) of the enemy character 20 toward the player. Thus, the motion of the enemy character 20 in which the head and gun thereof are turned toward the player can be implemented while using the motion data for such a walk motion as shown at F1. As a result, more various motions can be represented by using only a single set of motion data, in comparison with the simple motion correction as shown at F1 of FIG. 10.

Furthermore, the second motion correction is performed to slightly change the skeleton shape of the enemy character 20 depending on hit shots from the player. Thus, the skeleton shape of the enemy character can be slightly changed when it is hit by shot while turning the head and gun (or in a broad sense, a given part) of the enemy character toward the player (or in a broad sense, target position). As a result, more various motions can be represented by using only a single set of motion data, in comparison with only the simple motion correction as shown at F1 of FIG. 10 or only the first motion correction as shown at F2 of FIG. 10.

It is further desirable that flags (or in a broad sense, information) used for enabling or disabling each motion correction can be set to each of the enemy characters (or model objects).

Figure 11A:
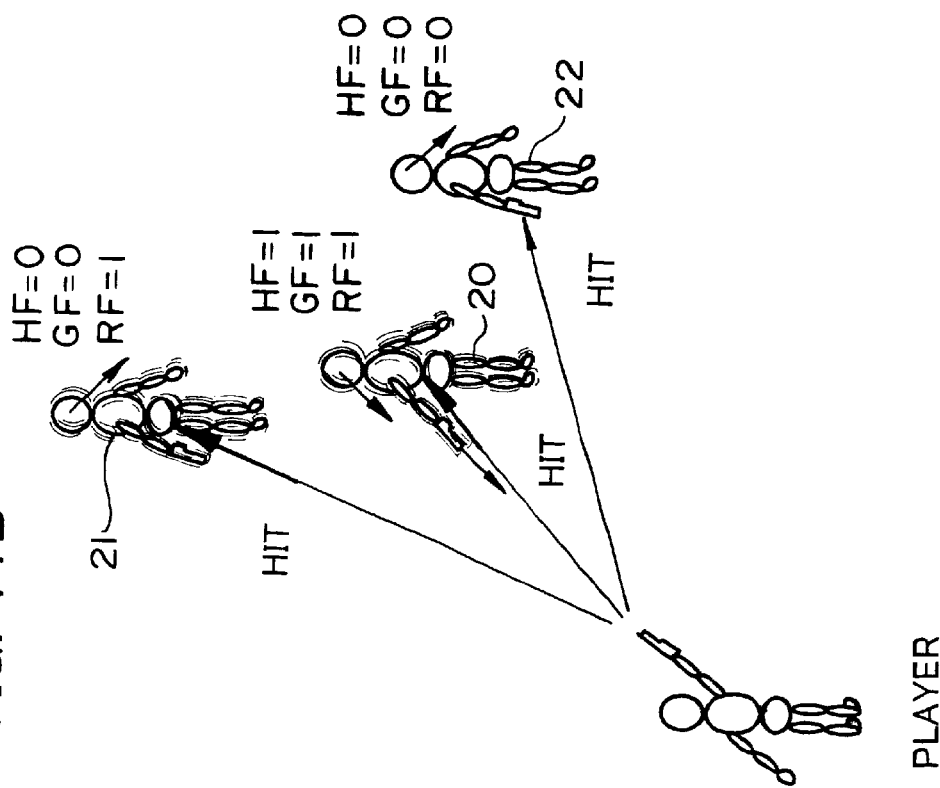
FIGS. 11A and 11B illustrate flags used to enable or disable each motion correction.
Figure 11B:
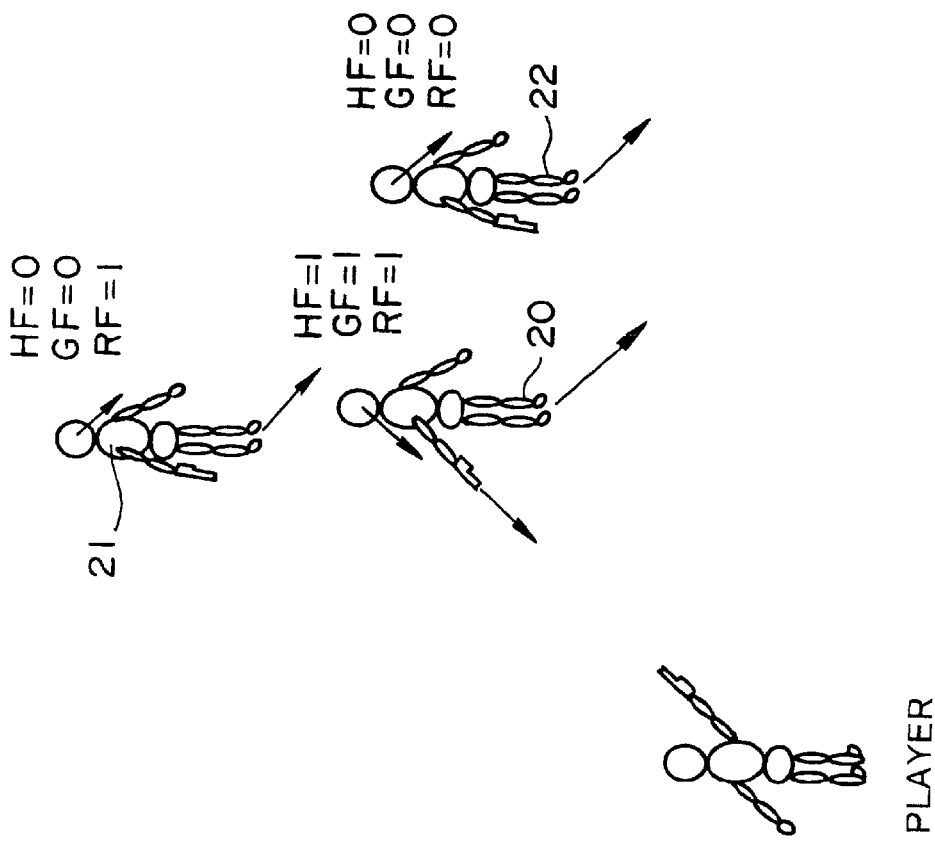

In FIG. 11A, for example, flag HF (which is used to enable or disable the motion correction for turning the head toward the player), flag GF (which is used to enable or disable the motion correction for turning the gun toward the player) and flag RF (which is used to enable or disable the motion correction for reacting against a hit impact) are all set at 1 (enabled) for one enemy character 20. As shown in FIG. 11B, thus, this enemy character 20 turns the head and gun toward the player and exhibits a reaction (slight vibration) when it is hit by a shot.

On the other hand, for another enemy character 21, the flags HF and GF are set at 1 (enabled) while the flag RF is set at 0 (disabled). As shown in FIG. 11B, thus, this enemy character 21 exhibits a reaction when it is hit by shot, but the head and gun thereof are not turned toward the player.

For still another enemy character 22, all the flags HF, GF and RF are set at 0 (disabled). Therefore, the enemy character 22 does not turn the head and gun toward the player and does not exhibit any reaction when it is hit by shot, as shown in FIG. 11B.

Figure 12A:
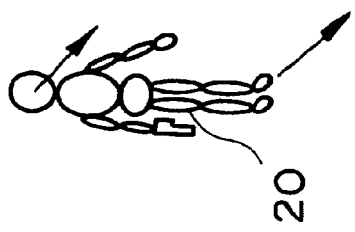
FIGS. 12A and 12B also illustrate flags used to enable or disable each motion correction.
Figure 12A:
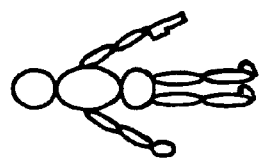
Figure 12B:
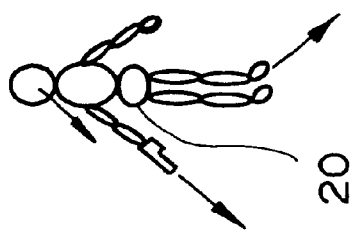
Figure 12B:
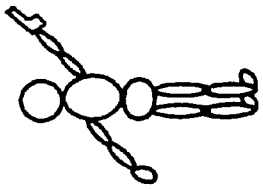

In FIG. 12A, all the flags HF, GF and RF are set at 1 (enabled) for the enemy character 20 since it is during the game play. During the game play, therefore, the enemy character 20 turns the head and gun toward the player and is slightly vibrated when it is hit by shot.

On the other hand, all the flags HF, GF and RF are set at 0 (disabled) for the enemy character 20 since it is during the demonstration (or attraction). During the demonstration, therefore, the enemy character 20 does not exhibit any reaction even when it is hit by shot and the head and gun thereof are not turned toward the player.

When various flags used to control enabling and disabling of the motion correction can be set to each enemy character, the enemy characters may be moved in different manners depending on the situation and mode of game. Even though the enemy characters are to be moved according to the same program or through the same motion data, they can be moved in various different manners by varying the flags. As a result, the enemy characters can be realized with more various representations of motion.

3. Processing in this Embodiment

Details of the processing in this embodiment will now be described with reference to flowcharts.

Figure 13:
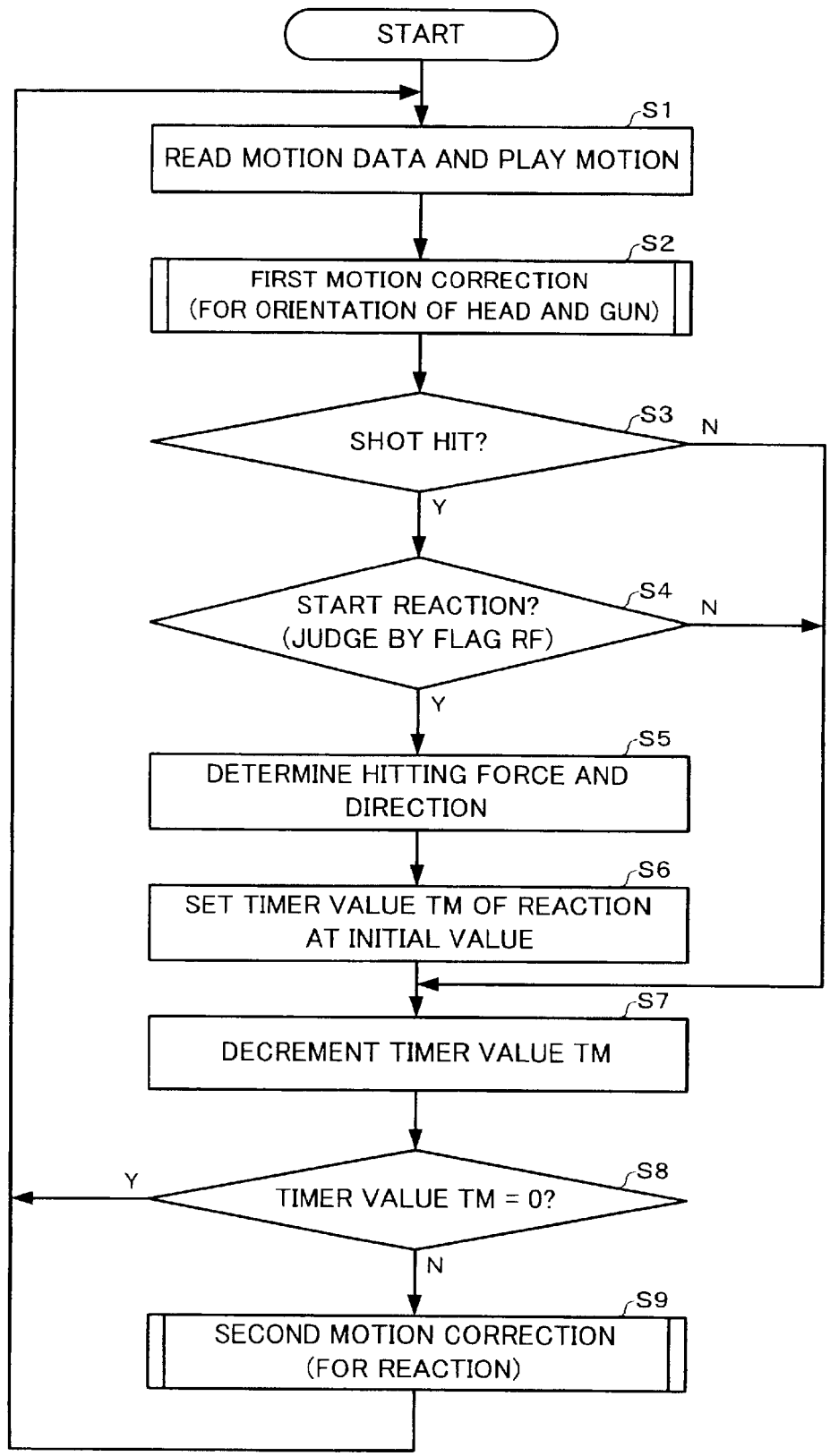
FIG. 13 is a flowchart showing the entire process in this embodiment.

FIG. 13 is a flowchart illustrating the entire process in this embodiment.

First of all, the motion data is read out from the motion data storage portion 142 of FIG. 2. Based on the motion data read out, the motion play is performed (step S1). In other words, the position and rotation angle of each of the parts (or bones) in the corresponding frame are determined based on the motion data.

The first motion correction is performed relating to the directions of the head and gun in such a manner as described in connection with F2 of FIG. 10 (step S2).

It is then judged whether or not an enemy character is hit by a shot. If do so, the procedure proceeds to step S4. If not so, the procedure proceeds to step S7 (step S3).

If the procedure proceeds to step S4, it is then judged, based on the flag RF as described in FIGS. 11A–12B, whether or not the reaction of the enemy character (or the second motion correction) should be started. If do so, the procedure proceeds to step S5. If not so, the procedure proceeds to step S7.

If the procedure proceeds to step S5, the hitting force and direction are determined. Furthermore, the timer value TM of the reaction described in FIGS. 7A, 7B, 7C and 7D is set at its initial value (e.g., 90) (step S6).

The timer value TM is then decremented and it is judged whether or not the timer value MT becomes equal to zero (step S8). If the value MT becomes equal to zero, the procedure returns to step S1 as it is. If the timer value MT is not equal to zero, the procedure proceeds to step S9 wherein the second motion correction relating to the reaction is performed. Thereafter, the procedure returns to step S1.

In such a manner, the procedure for one frame is completed.

Figure 14:
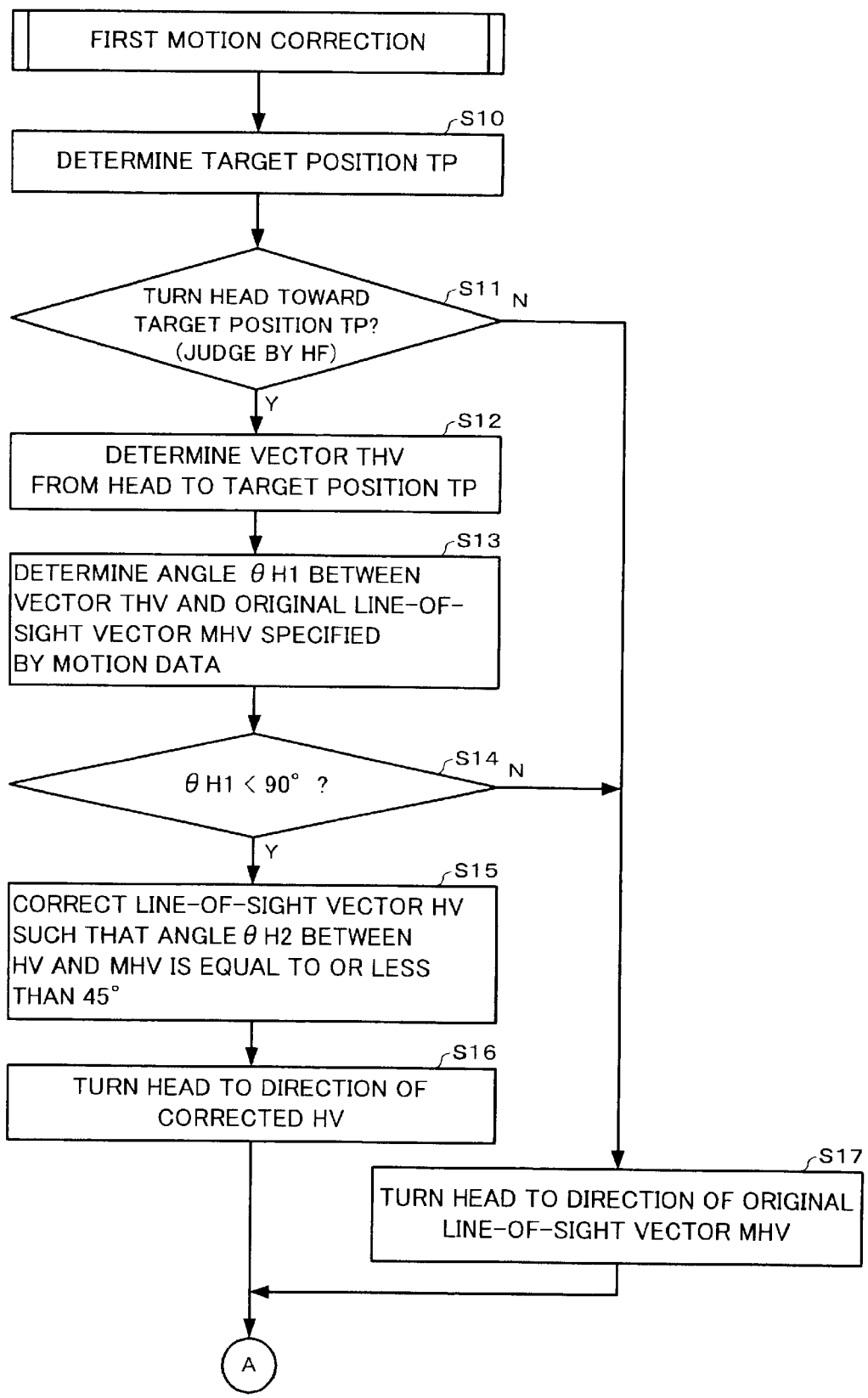
FIG. 14 is a flowchart showing the first motion correction process.

FIG. 14 is a flowchart illustrating the first motion correction described in connection with the step S2 of FIG. 13.

Figure 16:
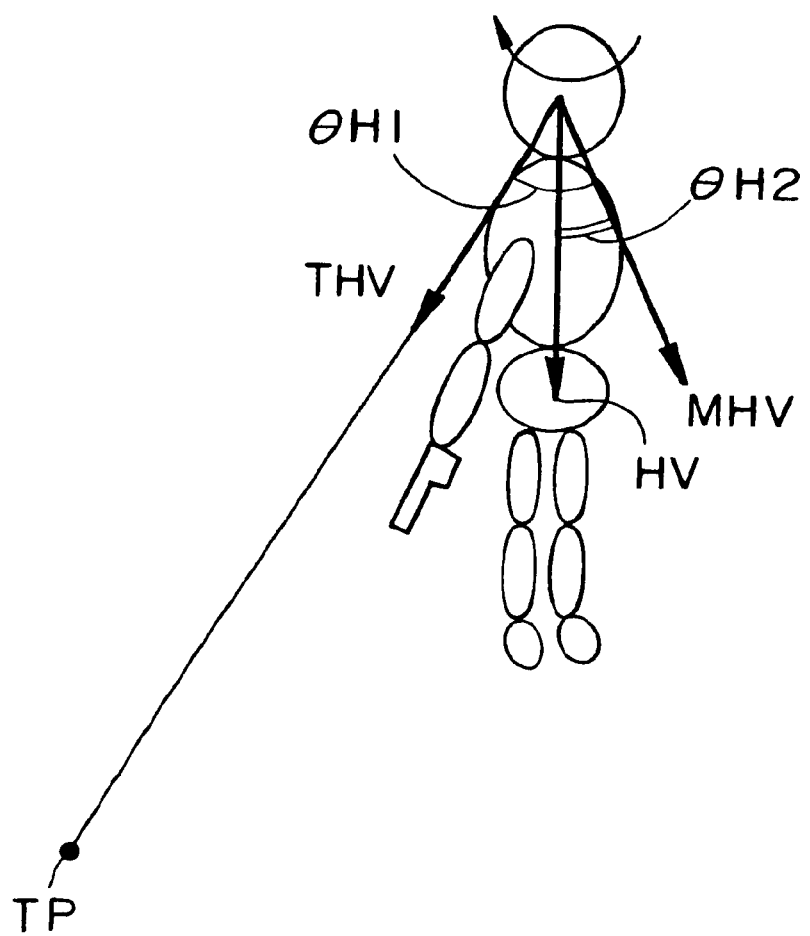
FIG. 16 illustrates a technique of turning a head of an enemy character toward a target position.

First of all, a target position TP shown in FIG. 16 (e.g., player's position) is determined (step S10).

It is then judged, based on the flag HF described in FIGS. 11A–12B, whether or not the head of the enemy character should be turned toward the target position TP (step S1). If it is judged that the head should be turned toward the target position, the procedure proceeds to step S12. If not so, the procedure proceeds to step S17.

If the procedure proceeds to step S17, the head of the enemy character is turned toward original line-of-sight vector MHV which is specified by the motion data.

On the other hand, if the procedure proceeds to step S12, a vector THV from the head to the target position TP is determined as shown in FIG. 16. An angle $\theta H1$ included between the original line-of-sight vector MHV specified by the motion data and the vector THV is determined (step S13).

It is then judged whether or not the angle $\theta H1$ is smaller than 90 degrees (step S14). If the angle $\theta H1$ is equal to or larger than 90 degrees, the procedure proceeds to step S17 wherein the head of the enemy character is turned toward the original line-of-sight vector MHV. In other words, if the angle $\theta H1$ is equal to or larger than 90 degrees, the head of the enemy character will not be turned toward the player. This is because the rotation of the head through an angle equal to or larger than 90 degrees is not natural in view of the real world event.

If the angle $\theta H1$ is smaller than 90 degrees, the line-of-sight vector HV in the enemy character is corrected so that an angle θH2 included between the vector HV and the vector MHV falls within 45 degrees (step S15). The head is then turned toward the corrected vector HV (step S16).

It is then judged, based on the flag GF described in FIGS. 11A to 12B, whether or not the gun should be turned toward the target position TP (or the player) (step S18). If not so, the procedure proceeds to step S24. If do so, the procedure proceeds to step S19.

If the procedure proceeds to step S24, the breast and both arms are turned to the original direction specified by the motion data.

Figure 17A:
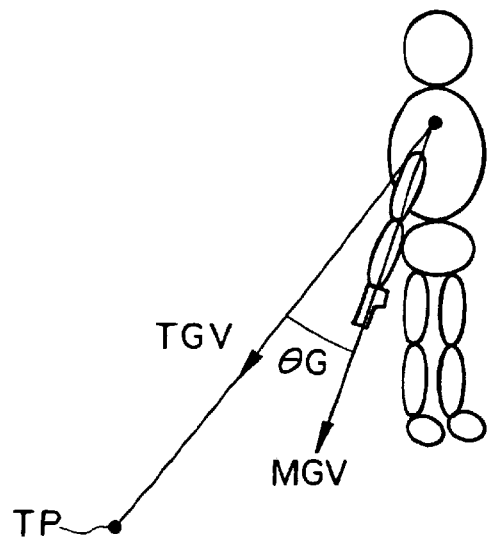
FIGS. 17A, 17B and 17C illustrate a technique of turning a gun of an enemy character toward a target position.

On the other hand, if the procedure proceeds to step S19, a vector TGV from the breast to the target position TP is determined as shown in FIG. 17A. An angle θG included between the original gun direction vector MGV specified by the motion data and the vector TGV is also determined (step S20).

It is then judged whether or not the angle θG is smaller than 60 degrees (step S21). If the angle θG is equal to or larger than 60 degrees, the procedure proceeds to step S24 wherein the breast and both arms of the enemy character are turned to the original direction specified by the motion data.

Figure 17B:
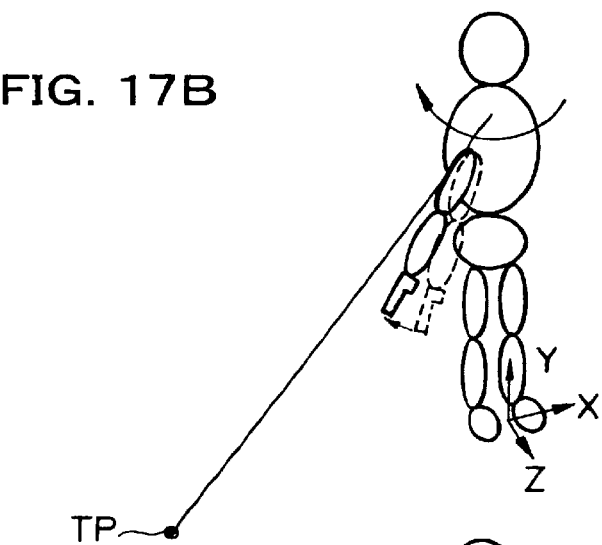
Figure 17C:
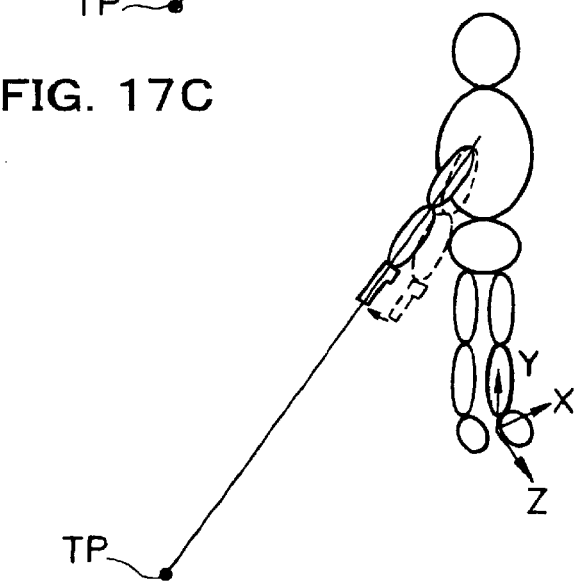

On the other hand, if the angle θG is smaller than 60 degrees, the breast is rotated about Y-axis in the base coordinate system for aligning, as shown in FIG. 17B (step S22) Both the arms are then rotated about X-axis in the breast coordinate system for aligning, as shown in FIG. 17C (step S23).

In such a manner, the first motion correction in which the head and gun of the enemy character are turned toward the target position (or player).

Figure 18:
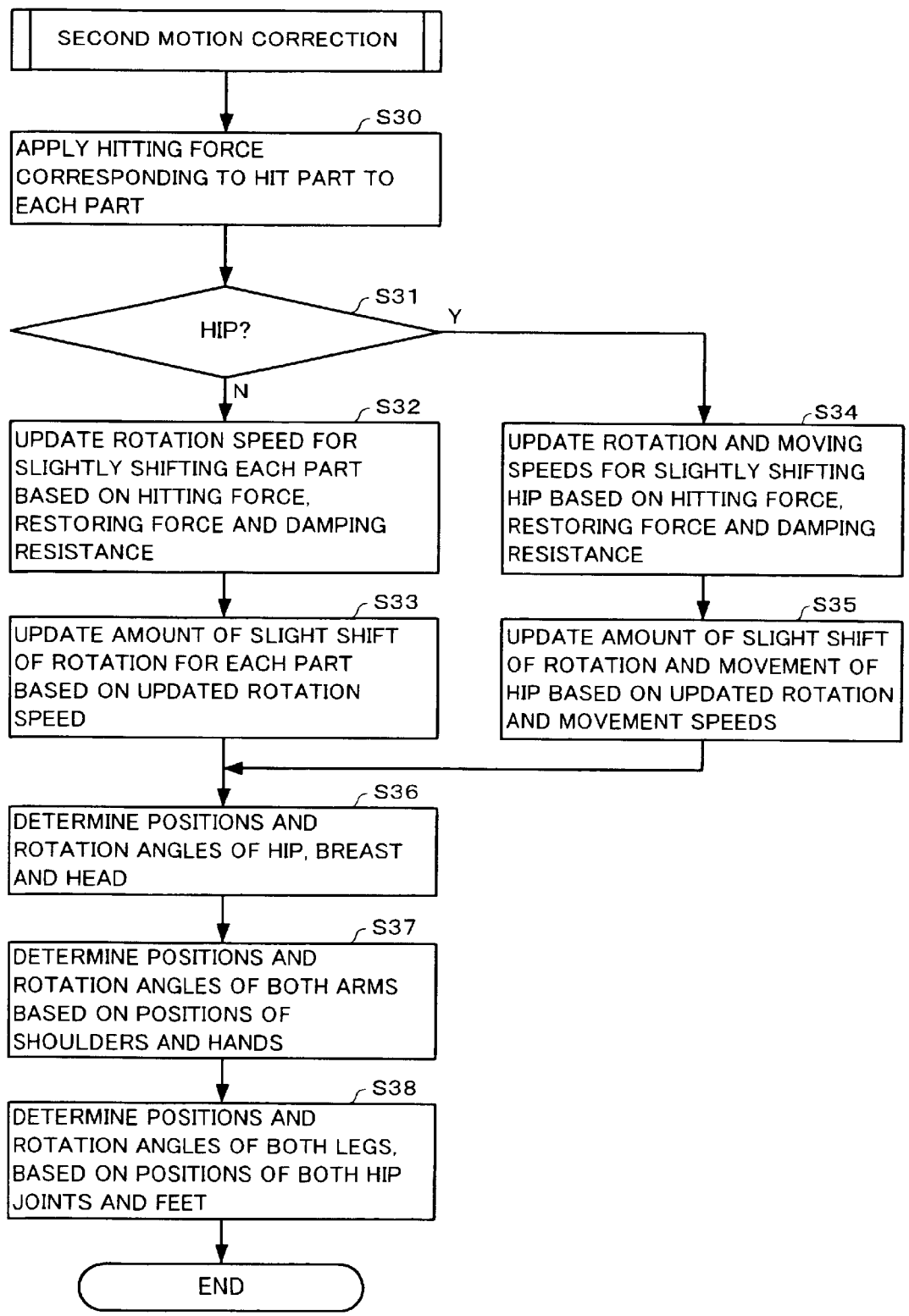
FIG. 18 is a flowchart showing the second motion correction process.

FIG. 18 is a flowchart of the second motion correction shown at the step S9 of FIG. 13.

Figure 19A:
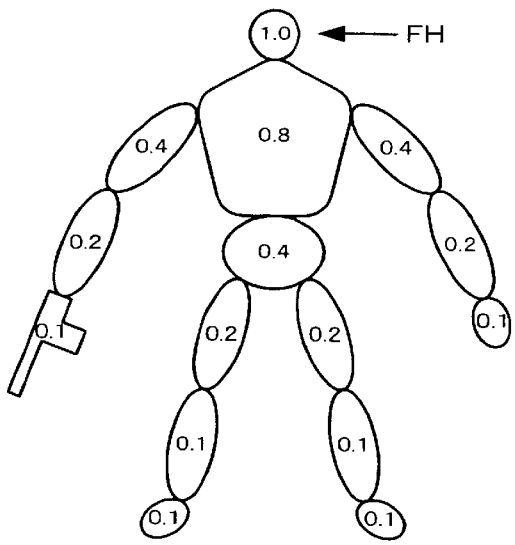
FIGS. 19A to 19E illustrate a technique of performing the second motion correction.

First of all, the hitting force corresponding to the hit part is applied to that part (or bone) (step S30). For example, a shot hits the head in FIG. 19A. In such a case, the hitting force against the head is maximized. As the distance between the head and that part increases, the hitting force applied is reduced.

It is then judged whether or not the part to be processed is the hip of the enemy character (step S31). If not so, the rotational speed for slightly shifting (moving) the respective parts (or bones) is updated based on the hitting force, restoring force (see FIGS. 6A–C) and damping resistance. More particularly, such a calculation as shown by the following expression (1) is done.

$$\omega n = \omega n-1 - K1 \times \Delta\theta n-1 - K2 \times \omega n-1 + FH \quad (1)$$

In the above expression (1), ωn and ωn−1 are rotational speeds in the n-th and (n−1)-th frames; K1 is spring coefficient (or coefficient in the restoring force); Δθn−1 is the amount of slight rotation shift in a part at the (n−1)-th frame; K2 is coefficient of damping resistance; and FH is hitting force.

Thereafter, the amount of slight rotation shift in each part (or bone) is updated based on the updated rotational speed. More particularly, such a calculation as shown by the following expression (2) is done.

$$\Delta\theta n = (TM/TMS) \times (\Delta\theta n-1 + \Delta n) \quad (2)$$

In the above expression (2), TM is such a timer value as described in FIGS. 7A–D; TMS is the initial timer value (e.g., 90); Δθn and Δθn−1 are the amounts of slight rotation shift at the n-th and (n−1)-th frames; and ωn is the amount of slight rotation shift determined by the aforementioned expression (1).

The calculations of the expressions (1) and (2) are actually performed for rotation about each axis.

If the hip of the enemy character is to be processed, the moving speed is also updated in addition to the rotational speed (step S34). Furthermore, the amount of slight movement shift is also updated in addition to the amount of slight rotation shift (step S35)

Figure 19B:
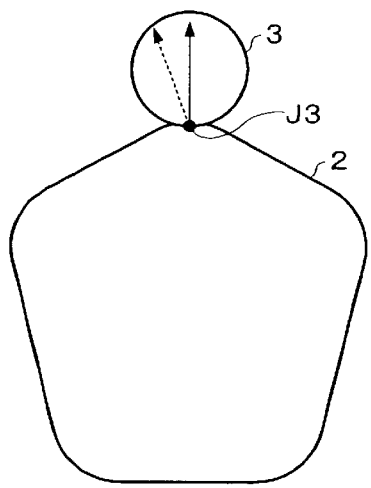

More particularly, a part other than the hip (e.g., the head 3) is shifted only through the rotational angle, as shown in FIG. 19B. However, the hip 1 is shifted relating to not only the rotational angle but also the position, as shown in FIG. 19C.

Figure 19D:
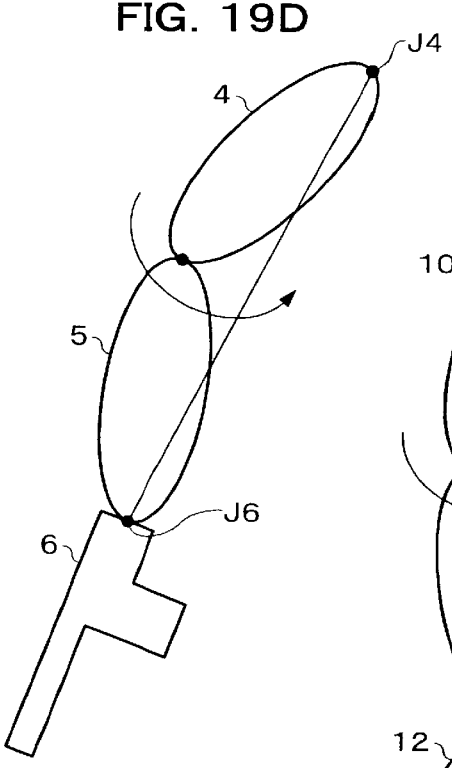
Figure 19E:
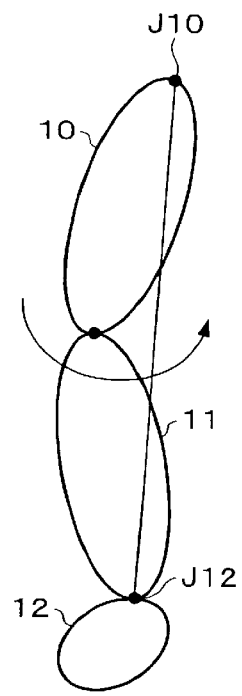
Figure 19C:
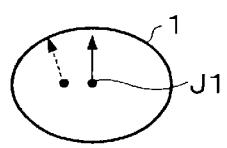

In this connection, one arm (including upper arm and forearm) is slightly rotated about an axis connecting between the shoulder and the hand as shown in FIG. 19D since the hand (or gun) is fixed to have a reduced degree of freedom as described in FIG. 8. One leg (including thigh and shin) is slightly rotated about an axis connecting between the hip joint and the foot as shown in FIG. 19E since the foot is fixed to have a reduced degree of freedom as described in FIG. 8.

Next, the positions and rotation angles of the hip, breast and head will be determined (step S36).

More particularly, the position and rotation angle of the base BS shown in FIG. 3 is first determined based on the motion data. Based on the position and rotation angle of this base BS, the motion data and the amounts of slight rotation and movement shifts determined at the step S35, the position and rotation angle of the hip is determined (that is, the matrix of the coordinate transformation of the hip bone to the world coordinate system being determined).

Figure 15:
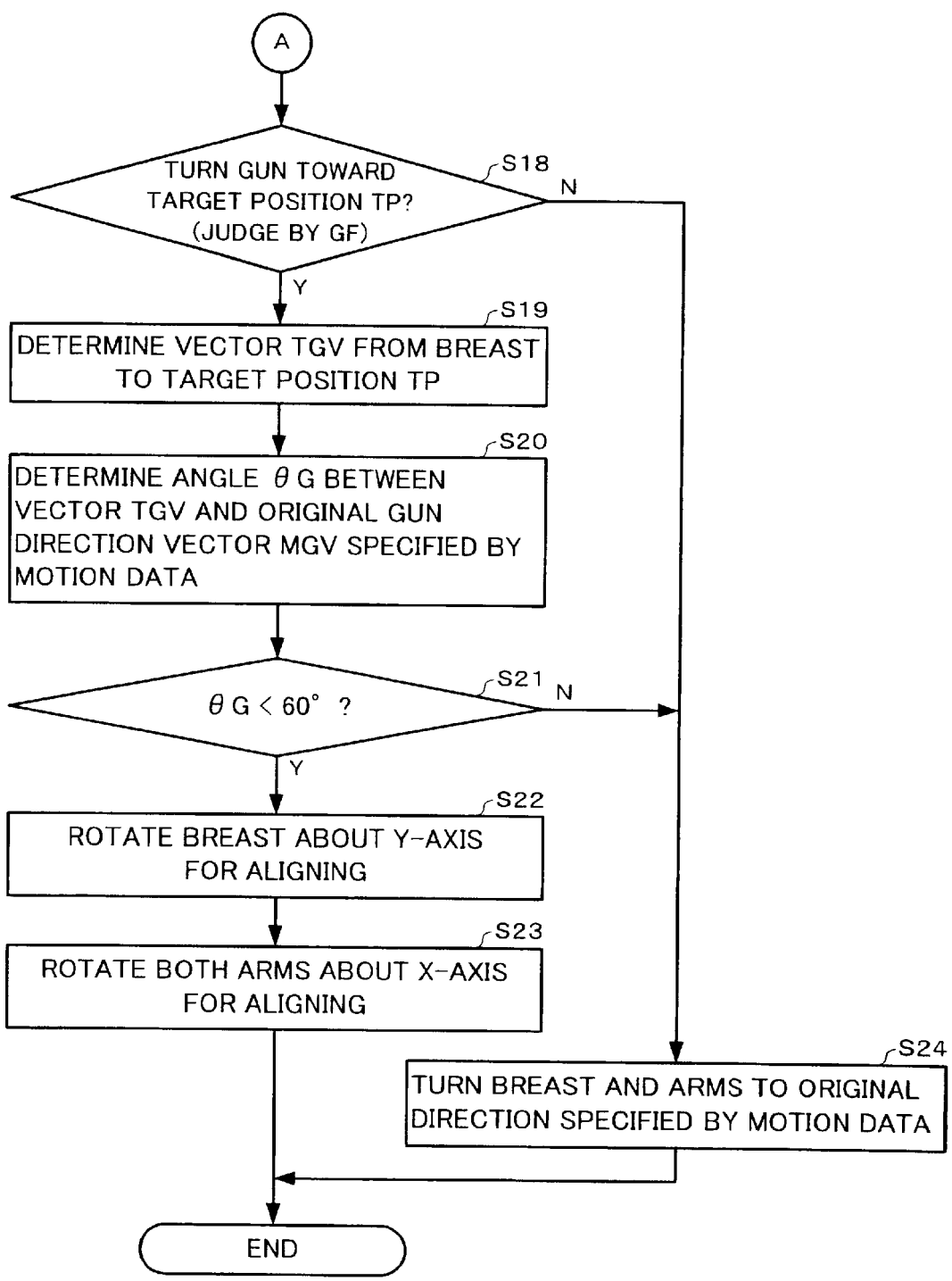
FIG. 15 is a flowchart showing the first motion correction process.

Based on the determined position and rotation angle of the hip, the motion data varied by the first motion correction of FIGS. 14 and 15 and the amount of slight rotation shift obtained at the step S33, the position and rotation angle of the breast is determined (that is, the matrix of the coordinate transformation of the breast bone to the world coordinate system being determined).

Based on the determined position and rotation angle of the breast, the motion data varied by the first motion correction of FIGS. 14 and 15 and the amount of slight rotation shift obtained at the step S33, the position and rotation angle of the head is determined (that is, the matrix of the coordinate transformation of the head bone to the world coordinate system being determined).

The positions and rotation angles of the arms are then determined based on the positions of the shoulders specified by the position and rotation angle of the breast and the positions of both the fixed hands (or gun) (step S37). Namely, considering the amount of slight rotation shift in FIG. 19D, the positions and rotation angles of the upper arms and forearms are determined through inverse kinematics (that is, the matrix of the coordinate transformation of the upper arm and forearm bones to the world coordinate system being determined).

The positions and rotation angles of the legs are then determined based on the positions of the hip joints specified by the position and rotation angle of the hip and the positions of the fixed feet (step S37). Namely, considering the amount of slight rotation shift in FIG. 19E, the positions and rotation angles of the thighs and shins are determined through inverse kinematics (that is, the matrix of the coordinate transformation of the thigh and shin bones to the world coordinate system being determined).

In such a manner, the positions and rotation angles of all the parts (or bones) (that is, the matrixes of the coordinate transformation to the world coordinate system) are determined. Thereafter, the positions of the vertexes forming parts are determined (that is, each vertex being coordinate-transformed into the world coordinate system). Thus, the image of the enemy character can be generated.

4. Hardware Configuration

Figure 20:
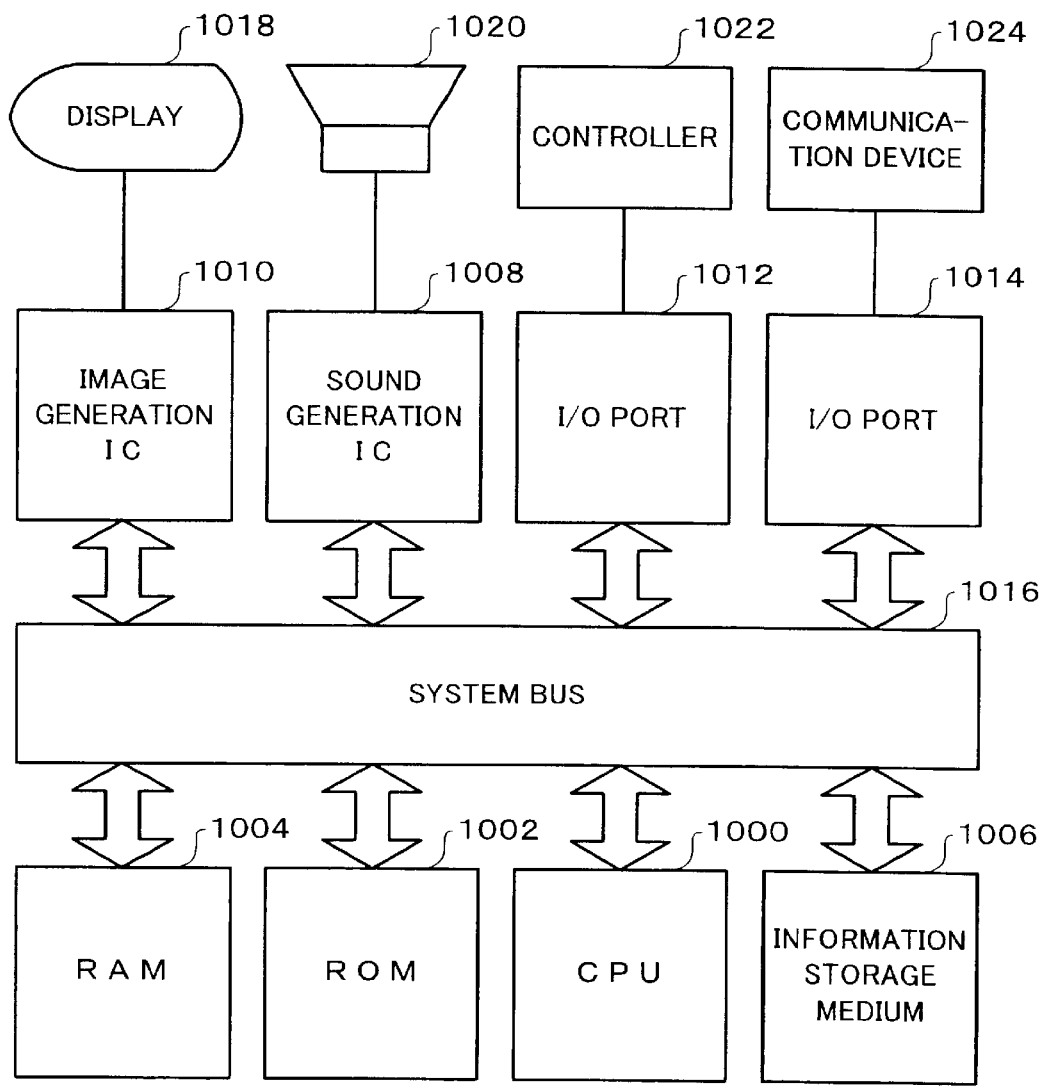
FIG. 20 shows an example of a hardware configuration for the embodiment of the present invention.

An example of a hardware configuration capable of implementing this embodiment will now be described with reference to FIG. 20. The system shown in FIG. 20 comprises CPU 1000, ROM 1002, RAM 1004, an information storage medium 1006, a sound generation IC 1008, an image generation IC 1010 and I/O ports 1012, 1014, all of which are interconnected through a system bus 1016 for data reception and transmission. The image generation IC 1010 is connected to a display 1018; the sound generation IC 1008 to a speaker 1020; the I/O port 1012 to a control device 1022; and the I/O port 1014 to a communication device 1024.

The information storage medium 1006 has mainly stored a program, image data for representing objects, sound data and others. For example, a home game apparatus may use DVD, game cassette, CD-ROM or the like as an information storage medium for storing the game program and other data. An arcade game apparatus may use a memory such as ROM or the like. In the latter case, the information storage medium 1006 is in the form of ROM 1002.

The control device 1022 corresponds to a game controller, control panel or the like. The control device 1022 is used by the player for inputting his or her judgment into the game apparatus according to the progress of game.

CPU 1000 is to perform the control of the entire game apparatus and the processing of various data according to the program stored in the information storage medium 1006, the system program (such as information for initializing the entire system) stored in the ROM 1002, input signals from the control device 1022 and so on. RAM 1004 is a memory means used as a working area for the CPU 1000 and has stored given contents in the information storage medium 1006 and ROM 1002 or the results of computation in the CPU 1000. The structures of data having a logical structure for realizing this embodiment may be build on this RAM or information'storage medium.

The sound and image generation IC's 1008, 1010 in this game apparatus are to output game sounds and images in a preferred manner. The sound generation IC 1008 is in the form of an integrated circuit for generating game sounds such as sound effects, background music and others, based on the information stored in the information storage medium 1006 and ROM 1002, the generated sounds being then outputted through the speaker 1020. The image generation IC 1010 is in the form of an integrated circuit which can generate pixel information to be outputted toward the display 1018 based on the image information from the RAM 1004, ROM 1002, information storage medium 1006 and so on. The display 1018 may be in the form of a so-called head mount display (HMD).

The communication device 1024 is to receive and transmit various pieces of information which are utilized in the game apparatus from and to external. The communication device 1024 is connected to the other game apparatus (or apparatuses) to transmit and receive given information corresponding to the game program from and to the other game apparatuses or utilized to transmit and receive the information including the game program and other data through the communication line.

Various processing steps previously described in connection with FIGS. 1 to 19E are realized by the information storage medium 1006 stored the information such as program, data and so on, and CPU 1000, image generation IC 1010 and sound generation IC 1008 which operate based on the information from the information storage medium 1006. The processings in the image generation IC 1010 and sound generation IC 1008 may be performed in a software manner through the CPU 1000 or all-purpose DSP.

When this embodiment is applied to such an arcade game apparatus as shown in FIG. 1, a system board (or circuit board) 1106 included in the game apparatus comprises CPU, image generation IC, sound generation IC and others all of which are mounted therein. The system board 1106 includes an information storage medium or semiconductor memory 1108 which has stored information for executing (or realizing) the processings of this embodiment (or means of the present invention). These pieces of information will be referred to "the stored information pieces".

Figure 21A:
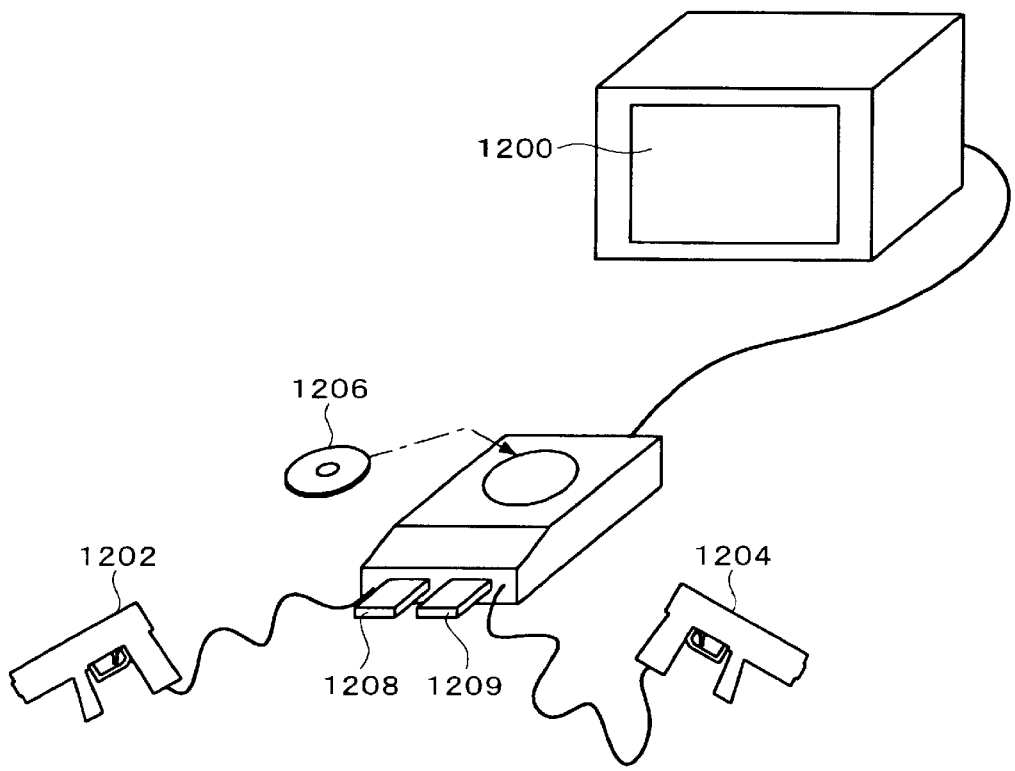
FIGS. 21A and 21B show various systems to which the embodiment of the present invention is applied.

FIG. 21A shows a home game apparatus to which this embodiment is applied. A player enjoys a game by manipulating game controllers 1202 and 1204 while viewing a game picture displayed on a display 1200. In such a case, the aforementioned stored information pieces have been stored in DVD 1206 and memory cards 1208, 1209 which are detachable information storage media in the game apparatus body.

Figure 21B:
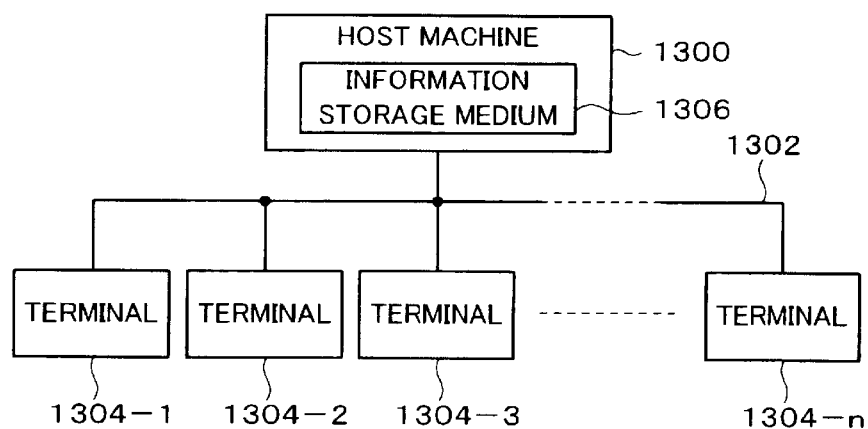

FIG. 21B shows an example wherein this embodiment is applied to a game system which includes a host machine 1300 and terminals 1304-1 to 1304-n connected to the host machine 1300 through a communication line (which is a small-scale network such as LAN or a global network such as the Internet) 1302. In such a case, the above stored information pieces have been stored in an information storage medium 1306 such as magnetic disk device, magnetic tape device, semiconductor memory or the like which can be controlled by the host machine 1300, for example. If the terminals 1304-1 to 1304-n are designed each to have a CPU, image generation IC and sound processing IC and to generate game images and game sounds in a stand-alone manner, the host machine 1300 delivers game program and other data for generating game images and game sounds to the terminals 1304-1 to 1304-n. On the other hand, if the game images and sounds cannot be generated by the terminals in the stand-alone manner, the host machine 1300 will generate the game images and sounds which are in turn transmitted to the terminals 1304-1 to 1304-n.

In the arrangement of FIG. 21B, the processings of the present invention may be decentralized into the host machine (or server) and terminals. The above information pieces for realizing the present invention may be distributed and stored into the information storage media of the host machine (or server) and terminals.

Each of the terminals connected to the communication line may be either of home or arcade type. When the arcade game systems are connected to the communication line, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above embodiment, but may be carried out in any of various other forms.

For example, the invention as defined in any depending claim may include only part of the components in any independent claim to which the depending claim belongs. The essential components in any independent claim of the present invention may be included in any other independent claim.

The technique of slightly changing the skeleton shape of the model object is not limited to that described in connection with this embodiment, but may be carried out in any of various other forms.

The techniques of motion correction are not limited to the forms of this embodiment.

Although this embodiment has been described as to the two-step motion correction, the present invention may similarly be applied to any other technique of three or more step type motion correction.

Although this embodiment has been described as to the model objects adopted as enemy characters, the model objects are not limited to the enemy characters, but may be used as various other characters each having at least a skeleton structure and being moved by the motion data, such as player's characters, moving bodies, stationary bodies and others.

Although this embodiment has been described as to the model object hit by a shot, the present invention is not limited to such a shot, but may include various other hits by sword, punch and kick.

In addition to the gun game, the present invention may be applied to any of various other games such as other shooting games, fighting games, robot fighting games, sports games, competition games, role-playing games, music playing games, dancing games and so on.

Furthermore, the present invention can be applied to various image generation systems such as arcade game systems, home game systems, large-scaled multi-player attraction systems, simulators, multimedia terminals, image generation systems, game image generation system boards and so on.

What is claimed is:

1. An image generation system comprising:

means for storing motion data of a model object;

means for reading stored motion data and performing motion play of the model object;

means for performing a hit check of the model object;

means for performing motion correction in which a skeleton shape of the model object specified by stored motion data is slightly changed based on hit information obtained by the hit check when the model object including a plurality of parts is hit; and means for generating images including an image of the model object, wherein the performance of motion play is based on the reading of stored motion data for motion play.

2. The image generation system as defined in claim 1, wherein the motion correction is performed based on the hit information and a restoring force for returning the skeleton shape of the model object to an original skeleton shape specified by the motion data.

3. The image generation system as defined in claim 1, wherein the motion correction is performed such that the amount of slight change of the skeleton shape by the hit information is gradually reduced as time passes.

4. The image generation system as defined in claim 1, wherein the motion correction is performed while substantially fixing a position or rotation angle of a given part of the model object.

5. The image generation system as defined in claim 1, wherein the motion correction is performed while substantially fixing a position or rotation angle of the body coordinate system of the model object relative to the world coordinate system to a position or rotation angle specified by the motion data.

6. The image generation system as defined in claim 1, wherein the motion correction is performed after a first motion correction has been finished in which a given part of the model object is turned toward a given target position.

7. An image generation system for generating an image, comprising:

means for storing motion data of a model object;

means for reading stored motion data and performing motion play of the model object;

means for performing a first motion correction in which a skeleton shape of a model object specified by stored motion data is changed, the model object including a plurality of parts, then performing a second motion correction in which the skeleton shape of the model object which has been changed by the first motion correction is further changed, and finally performing an N-th (N≧2) motion correction in which the skeleton shape of the model object which has been changed by the (N−1)-th motion correction is still further changed; and means for generating images including an image of the model object, wherein the performance of motion play is based on the reading of stored motion data for motion play.

8. The image generation system as defined in claim 7, wherein information for respectively enabling or disabling the first to N-th motion corrections is set to the model object.

9. The image generation system as defined in claim 7, wherein the first to N-th motion corrections are performed while substantially fixing a position or rotation angle of the body coordinate system of the model object relative to the world coordinate system to a position or rotation angle specified by the motion data.

10. An image generation system for generating an image, comprising:

means for storing motion data of a model object;

means for reading stored motion data and performing motion play of the model object;

means for performing a hit check of the model object;

means for changing a skeleton shape of the model object specified by stored motion data which includes a plurality of parts such that a given part of the model object is turned toward a given target position and the skeleton shape of the model object is slightly changed based on hit information obtained by the hit check when the model object is hit; and means for generating images including an image of the model object undergoing motion representation in a motion play process, wherein the motion play process is based on the motion data, wherein the performance of motion play is based on the reading of stored motion data for motion play.

11. A computer-readable program embodied on an information storage medium or in a carrier wave, comprising processing routines executed by a computer system:

store motion data of a model object;

read stored motion data and perform motion play of the model object;

perform a hit check of the model object;

perform motion correction in which a skeleton shape of a model object specified by stored motion data is slightly changed based on hit information obtained by the hit check when the model object including a plurality of parts is hit; and generate images including an image of the model object, wherein the performance of motion play is based on the reading of stored motion data for motion play.

12. The computer-readable program as defined in claim 11,
wherein the motion correction is performed based on the hit information and a restoring force for returning the skeleton shape of the model object to an original skeleton shape specified by the motion data.

13. The computer-readable program as defined in claim 11,
wherein the motion correction is performed such that the amount of slight change of the skeleton shape by the hit information is gradually reduced as time passes.

14. The computer-readable program as defined in claim 11,
wherein the motion correction is performed while substantially fixing a position or rotation angle of a given part of the model object.

15. The computer-readable program as defined in claim 11,
wherein the motion correction is performed while substantially fixing a position or rotation angle of the body coordinate system of the model object relative to the world coordinate system to a position or rotation angle specified by the motion data.

16. The computer-readable program as defined in claim 11,
wherein the motion correction is performed after a first motion correction has been finished in which a given part of the model object is turned toward a given target position.

17. A computer-readable program embodied on an information storage medium or in a carrier wave, comprising processing routines executed by a computer system:
store motion data of a model object;
read stored motion data and perform motion play of the model object;
perform a first motion correction in which a skeleton shape of a model object specified by stored motion data is changed, the model object including a plurality of parts, then perform a second motion correction in which the skeleton shape of the model object which has been changed by the first motion correction is further changed, and finally perform an N-th (N≧2) motion correction in which the skeleton shape of the model object which has been changed by the (N−1)-th motion correction is still further changed; and
generate images including an image of the model object, wherein the performance of motion play is based on the reading of stored motion data for motion play.

18. The computer-readable program as defined in claim 17,
wherein information for respectively enabling or disabling the first to N-th motion corrections is set to the model object.

19. The computer-readable program as defined in claim 17,
wherein the first to N-th motion corrections are performed while substantially fixing a position or rotation angle of the body coordinate system of the model object relative to the world coordinate system to a position or rotation angle specified by the motion data.

20. A computer-readable program embodied on an information storage medium or in a carrier wave, comprising processing routines executed by a computer system:
store motion data of a model object;
read stored motion data and perform motion play of the model object;
perform a hit check of the model object;
change a skeleton shape of a model object specified by stored motion data which includes a plurality of parts such that a given part of the model object is turned toward a given target position and the skeleton shape of the model object is slightly changed based on hit information obtained by the hit check when the model object is hit; and
generate images including an image of the model object undergoing motion representation in a motion play process, wherein the motion play process is based on the motion data, wherein the performance of motion play is based on the reading of stored motion data for motion play.

21. An image generation method comprising:
storing motion data of a model object;
reading stored motion data and performing motion play of the model object;
performing a hit check of the model object;
performing motion correction in which a skeleton shape of the model object specified by stored motion data is slightly changed based on hit information obtained by the hit check when the model object including a plurality of parts is hit; and
generating images including an image of the model object, wherein the performance of motion play is based on the reading of stored motion data for motion play.

22. The image generation method as defined in claim 21, comprising,
performing the motion correction based on the hit information and a restoring force for returning the skeleton shape of the model object to an original skeleton shape specified by the motion data.

23. The image generation method as defined in claim 21, comprising,
performing the motion correction such that the amount of slight change of the skeleton shape by the hit information is gradually reduced as time passes.

24. The image generation method as defined in claim 21, comprising,
performing the motion correction while substantially fixing a position or rotation angle of a given part of the model object.

25. The image generation method as defined in claim 21, comprising,
performing the motion correction while substantially fixing a position or rotation angle of the body coordinate system of the model object relative to the world coordinate system to a position or rotation angle specified by the motion data.

26. The image generation method as defined in claim 21, comprising,
performing the motion correction after a first motion correction has been finished in which a given part of the model object is turned toward a given target position.

27. An image generation method for generating an image, comprising:

storing motion data of a model object;

reading stored motion data and performing motion play of the model object;

performing a first motion correction in which a skeleton shape of the model object specified by stored motion data is changed, the model object including a plurality of parts, then performing a second motion correction in which the skeleton shape of the model object which has been changed by the first motion correction is further change, and finally performing an N-th (N≧2) motion correction in which the skeleton shape of the model object which has been changed by the (N−1)-th motion correction is still further changed; and generating images including an image of the model object, wherein the performance of motion play is based on the reading of stored motion data for motion play.

28. The image generation method as defined in claim 27, comprising, setting information for respectively enabling or disabling the first the N-th motion corrections to the model object.

29. The image generation method as defined in claim 27, comprising, performing the first to N-th motion corrections while substantially fixing a position or rotation angle of the body coordinate system of the model object relative to the world coordinate system to a position or rotation angle specified by the motion data.

30. An image generation method for generating an image, comprising:

storing motion data of a model object;

reading stored motion data and performing motion play of the model object;

performing a hit check of the model object;

changing a skeleton shape of the model object specified by stored motion data which includes a plurality of parts such that a given part of the model object is turned toward a given target position and the skeleton shape of the model object is slightly changed based on hit information obtained by the hit check when the model object is hit; and generating images including an image of the model object, wherein the performance of motion play is based on the reading of stored motion data for motion play.

* * * * *